United States Patent
Ueda et al.

(10) Patent No.: US 7,336,151 B2
(45) Date of Patent: Feb. 26, 2008

(54) RADIO TYPE LOCKING/UNLOCKING DEVICE

(75) Inventors: Shinichi Ueda, Saitama (JP); Kentaro Yoshimura, Saitama (JP); Suguru Asakura, Saitama (JP); Shinichi Arie, Saitama (JP); Kenichi Sawada, Saitama (JP); Sadanori Watarai, Miyazaki (JP)

(73) Assignees: Honda Motor Co., Ltd., Tokyo (JP); Hondalock Mfg. Co., Ltd., Miyazaki (JP)

( * ) Notice: Subject to any disclaimer, the term of this patent is extended or adjusted under 35 U.S.C. 154(b) by 662 days.

(21) Appl. No.: 10/681,322

(22) Filed: Oct. 9, 2003

(65) Prior Publication Data

US 2004/0142732 A1    Jul. 22, 2004

(30) Foreign Application Priority Data

Oct. 9, 2002    (JP)    ............................ P2002-296775

(51) Int. Cl.
| | |
|---|---|
| B60R 25/00 | (2006.01) |
| G05B 19/00 | (2006.01) |
| G06F 7/00 | (2006.01) |
| G08B 29/00 | (2006.01) |
| H04B 1/00 | (2006.01) |

(52) U.S. Cl. .................... 340/5.72; 340/5.61; 340/5.2; 340/10.1

(58) Field of Classification Search ............... 340/5.72, 340/5.61–5.63, 5.2–5.24, 10.1–10.2, 825.69, 340/825.72; 49/26; 235/380, 376
See application file for complete search history.

(56) References Cited

U.S. PATENT DOCUMENTS

| | | | | |
|---|---|---|---|---|
| 4,763,121 A | | 8/1988 | Tomoda et al. | |
| 5,499,022 A | * | 3/1996 | Boschini | 340/5.62 |
| 5,969,597 A | * | 10/1999 | Weigl et al. | 340/5.61 |
| 6,194,997 B1 | | 2/2001 | Buchner et al. | |
| 6,218,929 B1 | * | 4/2001 | Furuta et al. | 340/5.2 |
| 6,218,932 B1 | * | 4/2001 | Stippler | 340/426.16 |
| 6,386,447 B1 | * | 5/2002 | Proefke et al. | 235/380 |
| 6,476,517 B1 | | 11/2002 | Okada | 307/10.2 |
| 6,522,027 B1 | * | 2/2003 | Morillon et al. | 307/10.3 |
| 6,624,741 B1 | * | 9/2003 | Dais et al. | 340/5.72 |
| 6,707,375 B2 | * | 3/2004 | Masudaya | 340/5.61 |
| 6,765,471 B1 | * | 7/2004 | Baudard et al. | 340/5.61 |
| 6,798,337 B2 | * | 9/2004 | Onuma et al. | 340/5.72 |

FOREIGN PATENT DOCUMENTS

AU    772048 B2    5/2000

(Continued)

*Primary Examiner*—Brian Zimmerman
*Assistant Examiner*—Nam Nguyen
(74) *Attorney, Agent, or Firm*—Arent Fox LLP

(57) ABSTRACT

The present invention provides an automatic locking/unlocking device which locks an opening/closing body when a normal response signal is received in response to a request signal sent to a predetermined zone around a vehicle body, comprising detector for detecting that the opening/closing body is closed, wherein the request signal is sent within the vehicle compartment in response to closing of the opening/closing body before the request signal is sent to the predetermined zone around the vehicle body and if the normal response signal is received in response to this request signal, transmission of the request signal to the predetermined zone around the vehicle body is prohibited, thereby suppressing consumption of power in the portable unit and ensuring a secure automatic locking.

12 Claims, 23 Drawing Sheets

FOREIGN PATENT DOCUMENTS

| | | |
|---|---|---|
| DE | 41 23 654 A1 | 1/1993 |
| DE | 198 02 532 C1 | 8/1999 |
| DE | 199 22 980 A1 | 12/2000 |
| DE | 100 64 141 A1 | 7/2002 |
| EP | 1 079 053 A3 | 2/2001 |
| JP | 59-058031 | 4/1984 |
| JP | 60-164571 | 8/1985 |
| JP | 62-37479 | 2/1987 |
| JP | 9-125776 A | 5/1997 |
| JP | 10-238184 | 9/1998 |
| JP | 2001-114073 A | 4/2001 |
| JP | 2001-140517 | 5/2001 |
| JP | 2001-193325 A | 7/2001 |

* cited by examiner

ZONE D: RQ1 ∩ RQ2
ZONE E: RQ1 ∩ RQ2 ∩ RQ3 ∩ RQ4
ZONE F: RQ3 ∩ RQ4
ZONE G: RQ1 ∩ (RQ2 ∪ RQ3 ∪ RQ4)
ZONE H: RQ1 ∩ RQ3 ∩ (RQ2 ∪ RQ4)
ZONE I: RQ3 ∩ (RQ1 ∪ RQ2 ∪ RQ4)
ZONE J: RQ2 ∩ (RQ1 ∪ RQ3 ∪ RQ4)
ZONE K: RQ2 ∩ RQ4 ∩ (RQ1 ∪ RQ3)
ZONE L: RQ4 ∩ (RQ1 ∪ RQ2 ∪ RQ3)

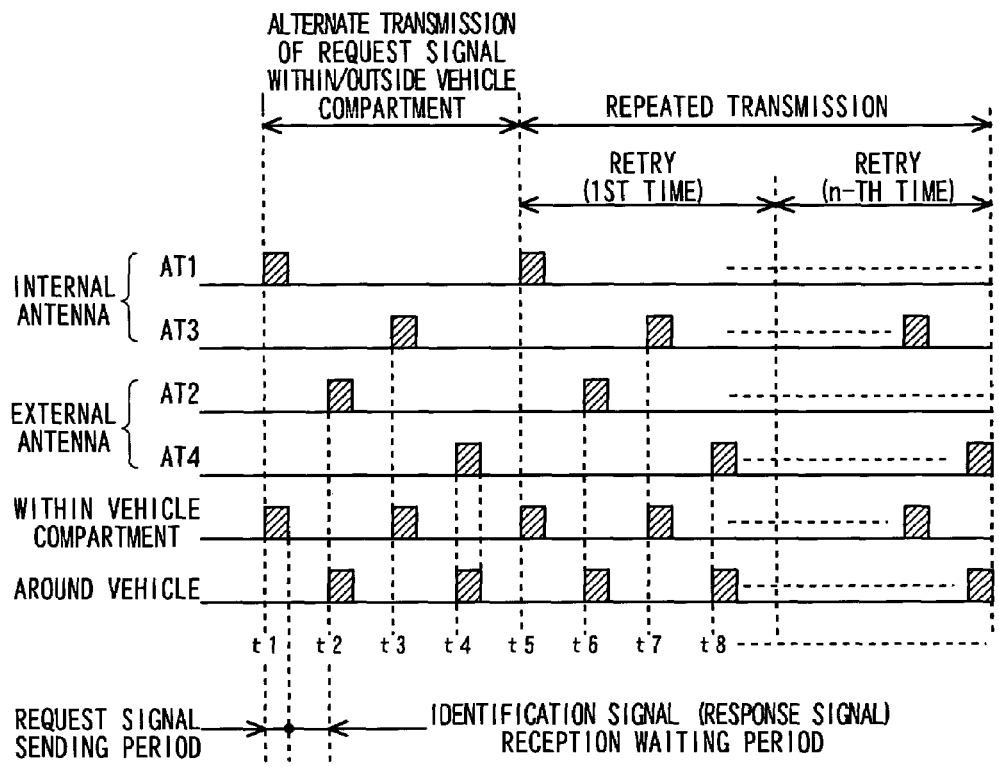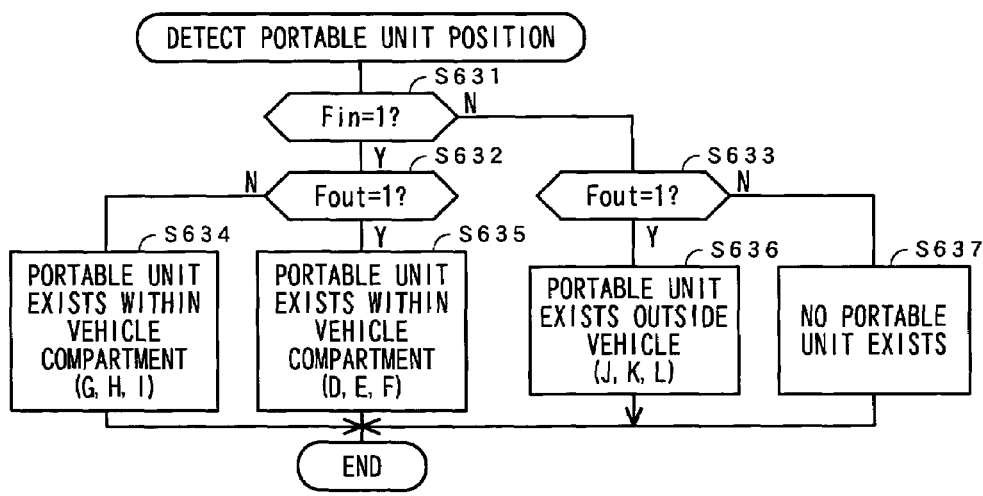

Fig. 26

| | | | | | | | | | | |
|---|---|---|---|---|---|---|---|---|---|---|
| WHEN DOOR OPEN DETECTED (S70–S71) | RESULT OF COMMUNICATION INSIDE/OUTSIDE VEHICLE COMPARTMENT (S71) | INSIDE VEHICLE COMPARTMENT | YES | YES | YES | NO | NO | | | |
| | | OUTSIDE VEHICLE COMPARTMENT | YES | NO | NO | YES | NO | | | |
| | DETERMINING PRESENCE/ABSENCE OF PORTABLE UNIT | | YES (S72) | YES (S72) | YES (S72) | YES (S72) | NO (S87) | | | |
| WHEN ALL DOORS CLOSED DETECTED (S81–S74) | RESULT OF COMMUNICATION INSIDE/OUTSIDE VEHICLE COMPARTMENT (S76) | INSIDE VEHICLE COMPARTMENT | YES | YES | NO | NO | | | | |
| | | OUTSIDE VEHICLE COMPARTMENT | YES | NO | YES | NO | | | | |
| | PORTABLE UNIT POSITION | | INSIDE VEHICLE COMPARTMENT (D,E,F) | INSIDE VEHICLE COMPARTMENT (G,H,I) | OUTSIDE VEHICLE COMPARTMENT (J,K,L) | | | | | |
| | DETERMINING RIDING ON/GETTING OUT | | RIDING ON | | GETTING OUT | | | | | |
| | AUTO LOCK PERMITTED/UNPERMITTED | | UNPERMITTED (S79) | PERMITTED (S77) | UNPERMITTED (S79) | | | | | |
| | RESULT OF INTERMITTENT TRANSMISSION (S91) | INSIDE VEHICLE COMPARTMENT | NOT TRANSMITTED | YES | YES | NO | NO | | | |
| | | OUTSIDE VEHICLE COMPARTMENT | | YES | NO | YES | NO | | | |
| | PORTABLE UNIT POSITION | | | INSIDE VEHICLE COMPARTMENT (D,E,F) | INSIDE VEHICLE COMPARTMENT (G,H,I) | OUTSIDE VEHICLE COMPARTMENT (J,K,L) | | | | |
| AUTO LOCK | CONTINUED/NONCONTINUED | | | CONTINUED | | | STOPPED (ALL DOORS LOCKED) | | | |
| | CONTINUED/NONCONTINUED (MODIFICATION) | | | STOPPED | CONTINUED | | STOPPED (ALL DOORS LOCKED) | | | |

RADIO TYPE LOCKING/UNLOCKING DEVICE

BACKGROUND OF THE INVENTION

1. Field of the Invention

The present invention relates to a wireless locking/unlocking device which is applicable to an opening/closing body such as automobile door and locks/unlocks that opening/closing body through communication with a portable unit. More particularly, the present invention relates to a wireless locking/unlocking device which achieves radio communication between a portable unit to which an inherent code is allocated and an on-vehicle unit and if no response occurs to a request signal transmitted from the on-vehicle unit, automatically locks the opening/closing body in order to prevent wasteful responses of the portable unit, in other words, prevent unnecessary communication between the on-vehicle unit and the portable unit thereby blocking waste loss of electricity.

2. Description of the Related Art

Japanese Patent Application Laid-Open No.SH062-37479 (conventional art 1) and Japanese Patent Application Laid-Open No.HEI10-238184 (conventional art 2) have disclosed automatic locking systems which comprise an on-vehicle unit and a portable unit which receives a request signal transmitted from the on-vehicle unit and sends back a response signal and if a driver or a passenger carrying the portable unit leaves the vehicle, the opening/closing body such as door or trunk is automatically locked.

According to the conventional art 1, if all doors are closed, a request signal is transmitted from a transmitter of the on-vehicle unit provided on a door mirror on driver' seat side or driver's seat to surrounding of the vehicle including its vehicle compartment (step S600 in FIG. 7). If no response signal is sent back from the portable unit in response to this request signal, it is determined that the portable unit is not being used and then an auto lock mode is released (negative in determination in step S601).

If the response signal is sent back, the request signal is sent intermittently (steps S603, S604, S605), when the response signal from the portable unit is interrupted, respective doors are locked (steps S606, S607). According to the conventional art 2, if the response signal from the portable unit is interrupted, the respective doors are locked.

According to the above-described conventional technology, even if auto lock is unnecessary like in a case where a vehicle driver opens and closes its door to ride on the vehicle, the request signal is transmitted to surrounding of the vehicle. Because this request signal passes through the vehicle windows and penetrates into the vehicle compartment because of the characteristic of radio propagation, existence of the portable unit is detected by the request signal sent when all the doors are closed, although the vehicle driver is riding on the vehicle and therefore, the request signal continues to be sent intermittently after that. Thus, the portable unit is driven to send wasteful responsive signals, so that electric power is consumed wastefully.

According to the conventional technology 1, even if auto lock is unnecessary like in a case where a vehicle driver opens the door [FIG. 13(*a*)] and rides on it [FIG. 13(*b*)], the request signal RQ is sent [FIG. 13(*c*)] if all the doors are closed. Then, the portable unit 2 responds to this and therefore, intermittent transmission of the request signal is continued [FIG. 13(*d*)], so that the portable unit 2 is driven to send wasteful response signals.

According to the conventional technology 1, if no response signal is returned to a request signal sent just after all the doors are closed, it is determined that the portable unit is not being used, so that auto lock is not executed. Thus, if, as shown in FIG. 14, a vehicle driver carrying the portable unit 2 and a passenger carrying no portable unit open its door so as to get out of the vehicle [FIG. 14(*a*), (b)], the vehicle driver closes the driver's seat side door [FIG. 14(*c*)] and leaves the vehicle body and after that, the passenger seat side door is closed so that all the doors are closed [FIG. 14(*d*)], the request signal RQ is sent to the vicinity of the driver's seat side door including the vehicle compartment.

However, because the portable unit 2 of the vehicle driver is located out of the effective transmission zone of the request signal, it is determined that the portable unit 2 is not being used and then, auto lock is not executed [FIG. 14(*e*)]. The effective transmission zone of the request signal refers to an effective arrival range which allows the request signal sent from the on-vehicle unit to be received by the portable unit.

In the Japanese Patent Application Laid-Open No.2001-140517 (conventional technology 3), such a technological problem that if user of the portable unit closes the door violently while leaving the vehicle body, the portable unit cannot respond to a request signal because the vehicle driver (portable unit) has already left out of the effective transmission zone, so that the auto lock function is not valid has been recognized and then, a technology for solving this problem has been proposed.

According to the conventional technology 3, the position of the portable unit is detected not only when the door is opened but also when it is closed, and the possible states are classified into four combinations (patterns 1 to 4) of which the portable unit exists within the vehicle compartment or outside the vehicle compartment when the door is closed, a case (pattern 4) where the portable unit does not exist within the vehicle compartment or outside the vehicle compartment when the door is closed, and combinations (patterns 4, 5) of whether or not the portable unit exists outside the vehicle compartment when the door is opened and different control styles are adopted for each classified state.

In this case, even if no portable unit exists within the vehicle compartment or outside the vehicle compartment when the door is closed, if it is recognized that the portable unit existed within the vehicle compartment at the time of door opening just before, automatic locking is carried out (pattern 4). Thus, even if the vehicle driver closes the door violently while leaving the vehicle or a passenger closes the door later, the automatic locking is also carried out.

Because the conventional technology 3 does not distinguish the "riding on the vehicle" from "getting out of the vehicle", the "door closing key detection" shown in FIG. 7 is always carried out when the door is closed. Thus, if the portable unit exists in a zone A within the vehicle compartment also like when a carrier of the portable unit closes the door after he rides on the vehicle, the request signal is always sent three times (S32→S33→S36→S37→S32 . . . ). For that reason, the technical problem that the vehicle battery and the portable unit battery are consumed wastefully has not been solved yet.

According to the conventional technology 3, when the door is opened or closed, "door opening key detection (FIG. 6)", "door closing key detection (FIG. 7)" and "door lock standby program (FIG. 8)" for detecting that a vehicle driver leaves the vehicle are executed and during each processing, communication is always established to detect the position of the portable unit. For that reason, because communication is always established through the above-described three processings each time when a person not carrying the portable unit opens or closed the driver's seat side door in order to ride on or get out of the vehicle for cleaning the vehicle compartment, power of the vehicle battery is consumed wastefully. Further, if the portable unit cannot be detected at any time of door opening/closing (pattern 5 in FIG. 9), an alarm is automatically raised after a predetermined time elapses, so that automatic locking is executed, which is a new problem to be solved.

The effective transmission zone in which the sent request signal can be received by the portable unit securely is affected by disturbance noise, so that it is reduced or expanded with respect to a preliminarily set effective transmission zone. For that reason, it is difficult to recognize the position of the portable unit accurately.

SUMMARY OF THE INVENTION

An object of the present invention is to provide a wireless locking/unlocking device which prohibits unnecessary transmission to suppress consumption of power in the portable unit as small as possible and prevents wasteful locking/unlocking so as to execute necessary locking/unlocking securely.

In order to achieve the above objection, the present invention provides a wireless locking/unlocking device comprising vehicle side transmitter for sending a request signal to at least a predetermined region in a vehicle compartment, wireless portable unit for sending a response signal in response to the request signal, vehicle side receiver for receiving the response signal, position detector for detecting the position of the portable unit depending on whether or not the response signal received by the vehicle side receiver coincides with identification information stored in the vehicle, A controller for outputting a locking signal based on a detection result of the portable unit position, and actuator for bringing a door lock mechanism into locking state in response to the locking signal, with means as follows:

(1) All-door closing detection which detects that all the doors are closed after a condition that at least one door is open and generates an all-door closing detecting signal, wherein the vehicle side transmitter sends the request signal in response to the all-door closing detecting signal and if it is detected that the portable unit exists within the vehicle compartment by the position detector, stops sending of sequent request signals, and if it is detected that the portable unit exists within the vehicle compartment by the position detector, the controller prohibits an output of the locking signal.

(2) The vehicle side transmitter sends the request signal to a predetermined region within the vehicle compartment and a predetermined region around the vehicle alternately and repeatedly multiple times and when it is detected that the portable unit exists within the vehicle compartment, stops repeating of the sending of the request signal.

(3) A second vehicle side transmitter for, after the position of the portable unit is detected by the position detector based on the request signal, sending the request signal to the predetermined regions within the vehicle compartment and around the vehicle; and a second position detector for detecting the position of the portable unit depending on whether or not the response signal in response to the request signal sent by the second vehicle side transmitter coincides with identification information inherent of the vehicle, wherein the second vehicle side transmitter, if it is detected that the portable unit does not exist within the vehicle compartment by the position detector, sends the request signal to the predetermined regions within the vehicle compartment and around the vehicle intermittently and the controller, if it is detected that the portable unit does not exist at least outside the vehicle by the second position detector when it is detected that the portable unit does not exist within the vehicle compartment by the position detector, outputs the locking signal.

(4) The second vehicle side transmitter sends the request signal to the predetermined regions within the vehicle compartment and around the vehicle alternately and repeatedly multiple times in an intermittent transmission cycle and when the second position detector detects an existence of the portable unit within the vehicle compartment, stops sending of the request signal and is shifted to a next intermittent transmission cycle and if the second position detector is incapable of detecting an existence of the portable unit in an intermittent transmission cycle, the intermittent transmission of the request signal is stopped, and the controller, if the second position detector is incapable of detecting the existence of the portable unit in an intermittent transmission cycle, outputs the locking signal.

(5) The second vehicle side transmitter, if the second position detector detects an existence of the portable unit within the vehicle compartment, stops sending of the request signal and the controller, if the second position detector detects an existence of the portable unit within the vehicle compartment in an intermittent transmission cycle, prohibits output of the locking signal.

(6) A door opening state detector for outputting a change of state that at least one of vehicle doors is changed from its closing state to its opening state, a door opening time vehicle side transmitter for sending the request signal to the predetermined regions within the vehicle compartment and around the vehicle by an output of the door opening state detector; and third position detector which detects the position of the portable unit in response to the door opening state detected by the door opening detector depending on whether or not the response signal coincides with identification information stored in the vehicle, wherein the vehicle side transmitter, if the third portable unit position detector detects an existence of the portable unit within the vehicle compartment and around the vehicle, sends the request signal to at least the predetermined region within the vehicle compartment.

According to the feature (1) of the present invention, attention is paid to that when all doors are closed, if user carrying a portable unit is riding on the vehicle, his or her portable unit exists within the vehicle compartment and when all the doors are closed, a request signal is transmitted at least within the vehicle compartment. By detecting the position of the portable unit based on ID information sent back from the portable unit, riding on the vehicle and getting out of the vehicle are discriminated. If it is detected that the portable unit exists within the vehicle compartment thereby clarifying that user is riding on the vehicle, the transmission of the request signal is stopped. Thus, waste consumption of vehicle battery and portable unit battery is prevented and output of a locking signal is prohibited, thereby preventing automatic locking from occurring when only a passenger gets out of the vehicle.

According to the feature (2) of the present invention, if it is detected that user gets out of the vehicle, the request signal is transmitted within the vehicle compartment and around the vehicle alternately and repeatedly multiple times. Consequently, even if the effective transmission zone is changed by disturbance noise, the position of the portable unit can be detected accurately. Additionally, because the request signal is transmitted within the vehicle compartment and around the vehicle alternately, the position of the portable unit 2 can be detected in a short time. Because if the portable unit is detected within the vehicle compartment, the transmission of the request signal which becomes unnecessary after that is stopped, even if a necessity of transmitting the request signal repeatedly considering an influence of disturbance noise occurs, wasteful consumption of vehicle battery and portable unit battery is prevented.

According to the feature (3) of the present invention, even if the portable unit does not exist within the vehicle compartment when all doors are closed and it is determined that user of the portable unit is located outside the vehicle compartment based on this fact, the request signal is transmitted intermittently to predetermined zones within the vehicle compartment and around the vehicle and then, if at least it is detected that the portable unit does not exist outside the vehicle compartment, a locking signal is outputted. Consequently, an unexpected automatic locking during a work around the vehicle for adjustment of door mirror position or the like is prevented and if user of the portable unit leaves the vehicle, the automatic locking is executed to prevent forgetting of locking a vehicle key. Additionally, because the request signal is transmitted intermittently, wasteful consumption of the vehicle battery and portable unit battery is suppressed as small as possible during monitoring of the portable unit position.

According to the feature (4) of the present invention, the second vehicle side transmitter sends the request signal repeatedly multiple times to the predetermined zones within the vehicle compartment and around the vehicle at an intermittent transmission timing (cycle) and when an existence of the portable unit is detected within the vehicle compartment, the repeated transmission of the request signal is stopped to go to a next intermittent transmission timing. That is, when the portable unit exists within the vehicle compartment, although it is detected that the portable unit does not exist within the vehicle compartment when user's getting out of the vehicle is detected, it is determined that the portable unit exists within an effective transmission zone expanded under the internal antenna due to an influence of disturbance noise, in other words, around the vehicle body and then, a next intermittent transmission timing begins. Consequently, wasteful transmission is blocked, thereby preventing wasteful consumption of vehicle battery and portable unit battery.

Further, because controller locks the door if second portable unit position detector cannot detect an existence of the portable unit outside the vehicle body with in a single cycle of the intermittent transmission, even if the effective transmission zone of the external antenna is reduced due to an influence of a single disturbance noise although the portable unit exists around the vehicle body, locking of the door by mistake is prevented.

According to the feature (5) of the present invention, if the second portable unit position detector detects an existence of the portable unit within the vehicle compartment, the second vehicle side transmitter stops transmission of the request signal and the controller prohibits output of the locking signal. Thus, if the existence of the portable unit is detected within the vehicle compartment in the intermittent transmission period so that locking the vehicle key is not necessary, for example, in a case where user of the portable unit hands over that portable unit to a passenger after he gets out of the vehicle, unnecessary transmission is stopped immediately thereby preventing wasteful consumption of vehicle battery and portable unit battery and further blocking an unexpected locking of the vehicle key.

According to the feature (6) of the present invention, if it is detected that at least one door is opened under a condition that all the doors are closed, the request signal is sent to predetermined zones within the vehicle compartment and around the vehicle. If getting out of the vehicle is detected in a case where the existence of the portable unit is detected within the vehicle compartment and around the vehicle, the request signal is sent to at least the predetermined zone around the vehicle. Consequently, in addition to determination on whether or not user gets out of the vehicle, whether or not he or she carries the portable unit is determined thereby achieving accurate locking control. For example, if the door is opened or closed to ride on or get out of the vehicle without carrying the portable unit for cleaning the vehicle compartment or the like, even if it is detected that all the doors are closed, no request signal is sent. Thus, wasteful consumption of the vehicle battery is prevented and automatic locking is not carried out, thereby preventing an unexpected locking and protecting its convenience even if automatic locking function is added.

The present invention further comprises following means.

(7) A transmitter for sending a request signal within the vehicle compartment, a receiver for receiving the response signal sent from a portable unit which receives the request signal; and a determining means which determines whether or not the portable unit exists within the vehicle compartment based on a presence/absence of the response signal, wherein if it is determined that the portable unit exists within the vehicle compartment, sequent transmission of request signals is prohibited.

In order to achieve the above objection, the present invention provides a wireless locking/unlocking device comprising a transmitter for sending a request signal, a receiver for receiving an response signal including an identification signal sent from a portable unit carried by user in response to reception of the request signal; and a controller for controlling the locking/unlocking of an opening/closing body corresponding to a presence/absence of reception of the identification signal by the receiver, the wireless locking/unlocking device, with means as follows:

(8) A closing timing detector for detecting that the opening/closing body is just closed, wherein the transmitter sends a request signal to the vehicle compartment in response to closing of the opening/closing body detected by the closing timing detector and when a response signal responding to a request signal sent within the vehicle compartment is received, prohibits sequent sending of the request signal to a predetermined region around the vehicle (S201→S206→S207→S209→S201→S219→Return of FIG. 7).

(9) When a response signal responding to the request signal sent within the vehicle compartment is not received, the transmitter sends a request signal to a predetermined region around the vehicle intermittently and the opening/closing body is locked under a condition that the response signal responding to the request signal sent to the predetermined region is not received (S201→S206→S207→S208→S201→S219→S301→S306→S307→S313 of FIGS. 7, 8)

(10) The transmitter, when the response signal responding to the request signal sent within the vehicle compartment is not received, sends the request signal to a predetermined region around the vehicle intermittently and if the response signal responding to the request signal sent to the predetermined region is not received, sends the request signal again to the vehicle compartment, and the opening/closing body is locked under a condition that the response signal responding to the request signal sent again within the vehicle compartment is not received (S201→S206→S207→S208→S201→S219→S301→S306→S307→S310→S312→S313 of FIGS. 7, 8)

(11) An opening timing detector for detecting (a moment) that the opening/closing body is just opened, wherein the transmitter sends the request signal to predetermined regions within the vehicle compartment and around the vehicle in response to opening of the opening/closing body detected by the opening timing detector and under a condition that the response signal responding to the request signal sent to the predetermined regions within the vehicle compartment and around the vehicle is received, sends the request signal to the vehicle compartment in response to closing of the opening/closing body (S101→S103→S104→S106→S107→S105→S201→S202→S206 or S101→S103→S104→S105→S201→S202→S206 of FIGS. 7, 8).

(12) The opening timing detector detects a moment that any closed door of a vehicle is just opened when all the doors are closed, and the closing timing detector detects a moment that any opened door is just closed so that all the door are closed.

(13) The transmitter prohibits sending of the request signal in response to an operation signal of a switch disposed within the vehicle compartment.

(14) A locking/unlocking detector for detecting the locking state and unlocking state of the opening/closing body, wherein the transmitter prohibits sending of the request signal corresponding to a detection of a locking state.

(15) A timer which starts time counting is response to the detected closing timing of the opening/closing body, wherein the transmitter prohibits sending of the request signal when the timer counts a predetermined time.

The present invention is accomplished by paying attention to that if all the doors are closed under a condition that any door is open when user carrying the portable unit rides on the vehicle (stays in the vehicle compartment), the portable unit always exists within the vehicle compartment (effective transmission zone C) and that if all the doors are closed under a condition that any door is open when user carrying the portable unit gets out of the vehicle (stays out of the vehicle), the portable unit never exists within the vehicle compartment.

According to the features (7), (8) of the present invention, if the request signal is sent to the vehicle compartment and then a response signal/ID code is received from the portable unit when all the doors are closed under a condition that any door is open, it is recognized that user of the portable unit rides on the vehicle and enters the vehicle compartment by this door closing motion and sequent transmission of the request signal (intermittent transmission of the request signal to the predetermined zone around the vehicle—effective transmission zone A or B) is prohibited, that is, the auto lock processing is terminated. Thus, unnecessary communication with the portable unit is not established, so that the frequency of communication of the portable unit is reduced thereby prolonging the service life of the battery (power saving). Additionally, communication between the vehicle and the portable unit induced when only a passenger gets out can be blocked.

According to the feature (9) of the present invention, if it is recognized that the portable unit does not exist within the vehicle compartment (it is recognized that user of the portable unit gets out of the vehicle) when all the doors are closed under a condition that any door is open, the auto lock processing is continued so that the request signal is sent intermittently to the predetermined zone around the vehicle. If any response signal is not received and no portable unit exists in the predetermined zone, automatic locking is executed. Thus, only when the automatic locking is necessary, that is, user of the portable unit gets out of the vehicle, the automatic locking is executed securely thereby preventing forgetting of locking the vehicle key. Additionally, the automatic locking during a work around the vehicle body, for example, adjustment of mirror position, can be blocked.

According to the feature (10) of the present invention, in addition to the operation and effect of the feature (2), if the portable unit does not exist in the predetermined zone around the vehicle, the request signal is sent to the vehicle compartment to verify again that the portable unit does not exist within the vehicle compartment and then, the automatic locking is carried out. Thus, the automatic locking due to leaving the portable unit within the vehicle compartment can be blocked securely.

According to the feature (11) of the present invention, only when the request signal is sent to the predetermined zones within the vehicle compartment and around the vehicle in response to opening of any door under a condition that all the doors are closed and its corresponding response signal is received so as to verify that the portable unit securely exists within the vehicle compartment or in the predetermined zone, the request signal described in the features (1) to (4) is sent corresponding to that the door is closed after that. Thus, the automatic locking is achieved securely regardless of the order about door closing operation by a passenger and door closing operation by a vehicle driver (user of the portable unit) and further when user of the portable unit gets out of the vehicle quickly, thereby preventing forgetting of locking the key. Additionally, it is possible to prevent locking of the key by mistake when other person carrying no portable unit opens or closes the door in a condition that it is unlocked.

According to the feature (12) of the present invention, the request signal is not sent each time when each door is opened, but when any door is opened under a condition that all the doors are closed, the request signal is sent to the predetermined zone within the vehicle compartment or around the vehicle to verify that the portable unit securely exists in the predetermined zone within the vehicle compartment or around the vehicle. After the verification, the request signal is not sent each time when any open door is closed, but the request signal is sent when all the doors are closed under a condition that any door is open. Consequently, the frequency of communication between the vehicle and the portable unit is reduced, thereby suppressing the frequency of sending back of the response signal to a minimum number, leading to prolonging of the service life of portable unit battery.

Further, it can be verified that the portable unit exists within the vehicle compartment or around the vehicle by minimum transmission frequency regardless of the order about the door closing operation by a passenger and the door closing operation by the vehicle driver (user of the portable unit).

According to the features (13), (14) of the present invention, if switch operation within the vehicle compartment or locking condition is detected, transmission of the request signal is prohibited and the auto lock processing is terminated. Consequently, unnecessary automatic locking in a case where a passenger stays in the vehicle compartment or a vehicle driver (user of the portable unit) locks the key intentionally by operating the key outside the vehicle is prevented and additionally, opportunity of sending a response signal from the portable unit is reduced, thereby prolonging the service life of the battery.

According to the feature (15), the intermittent transmission of the request signal is carried out only in a predetermined period thereby prolonging the service life of the battery in the portable unit.

BRIEF DESCRIPTION OF THE DRAWINGS

FIG. 23 is a timing chart showing transmission order of respective request signals;

FIG. 25 is a diagram showing the procedure for detecting the position of the portable unit based on a result of the "communication outside/inside vehicle" specifically; and FIG. 26 is a diagram showing the relationship between a detection result of portable unit position and success/failure of auto-lock according to the second embodiment of the present invention briefly.

DETAILED DESCRIPTION OF THE PREFERRED EMBODIMENTS

Hereinafter, preferred embodiments of the present invention will be described in detail with reference to the accompanying drawings.

According to this embodiment, attention is paid to that after user of a portable unit (driver or passenger) opens/closes the door to ride on it, the portable unit always exists within the vehicle compartment and after user of the portable unit opens/closes the door to get out of it, the portable unit does not exist within the vehicle and then, if the portable unit exists within the vehicle compartment after the door is opened/closed, it is determined that a current door opening/closing is for opening/closing for the driver or passenger to ride on the vehicle.

That is, if all doors are closed after any door is opened, a request signal is transmitted into a vehicle compartment and depending on whether or not a response signal/ID code responding to this request signal is produced, it is determined that user of the portable unit rides on the vehicle or gets out of the vehicle.

Because automatic locking is unnecessary in the case of door opening/closing for riding, transmission of the request signal after that is prohibited so as to prevent the portable unit from receiving the request signal. Consequently, an opportunity for this portable unit to respond to the request signal wastefully is reduced thereby preventing waste consumption of electricity.

Figure 1:
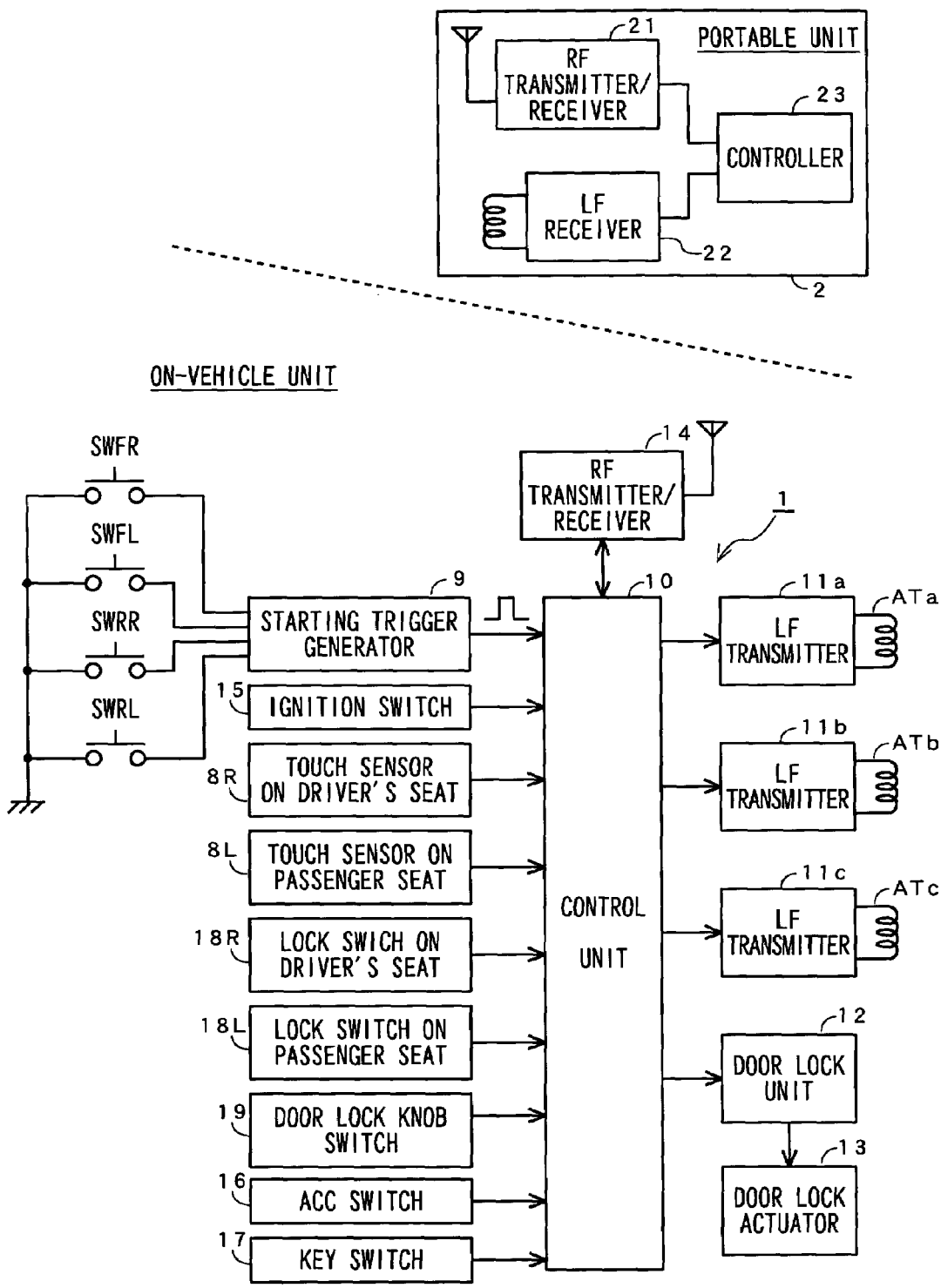
FIG. 1 is a block diagram showing the configuration of an automatic locking system for automobile according to an embodiment of the present invention.

FIG. 1 is a block diagram showing the configuration of the ratio type locking/unlocking device according to an embodiment of the present invention.

The wireless locking/unlocking device comprises an on-vehicle unit 1 which is loaded on a vehicle and a portable unit 2 which is carried by user of the vehicle and communicates with the on-vehicle unit 1 by radio communication.

In the on-vehicle unit 1, a starting trigger generator 9 detects a transmission of a request signal and generates a starting trigger. Because this embodiment is intended for a 4-door vehicle, a door switch (SWFR) for detecting opening/closing of the driver's seat door, a door switch (SWFL) for detecting opening/closing state of the passenger seat, a door switch (SWRR) for detecting opening/closing state of a rear door behind the driver's seat and a door switch (SWRL) for detecting opening/closing state of a rear door behind the passenger seat are provided. The respective door switches are turned ON when the door is open, and OFF when it is closed.

The starting trigger generator 9 generates a starting trigger when any door is opened after all the doors are closed or when all the doors are closed after at least one door is open.

Figure 2:
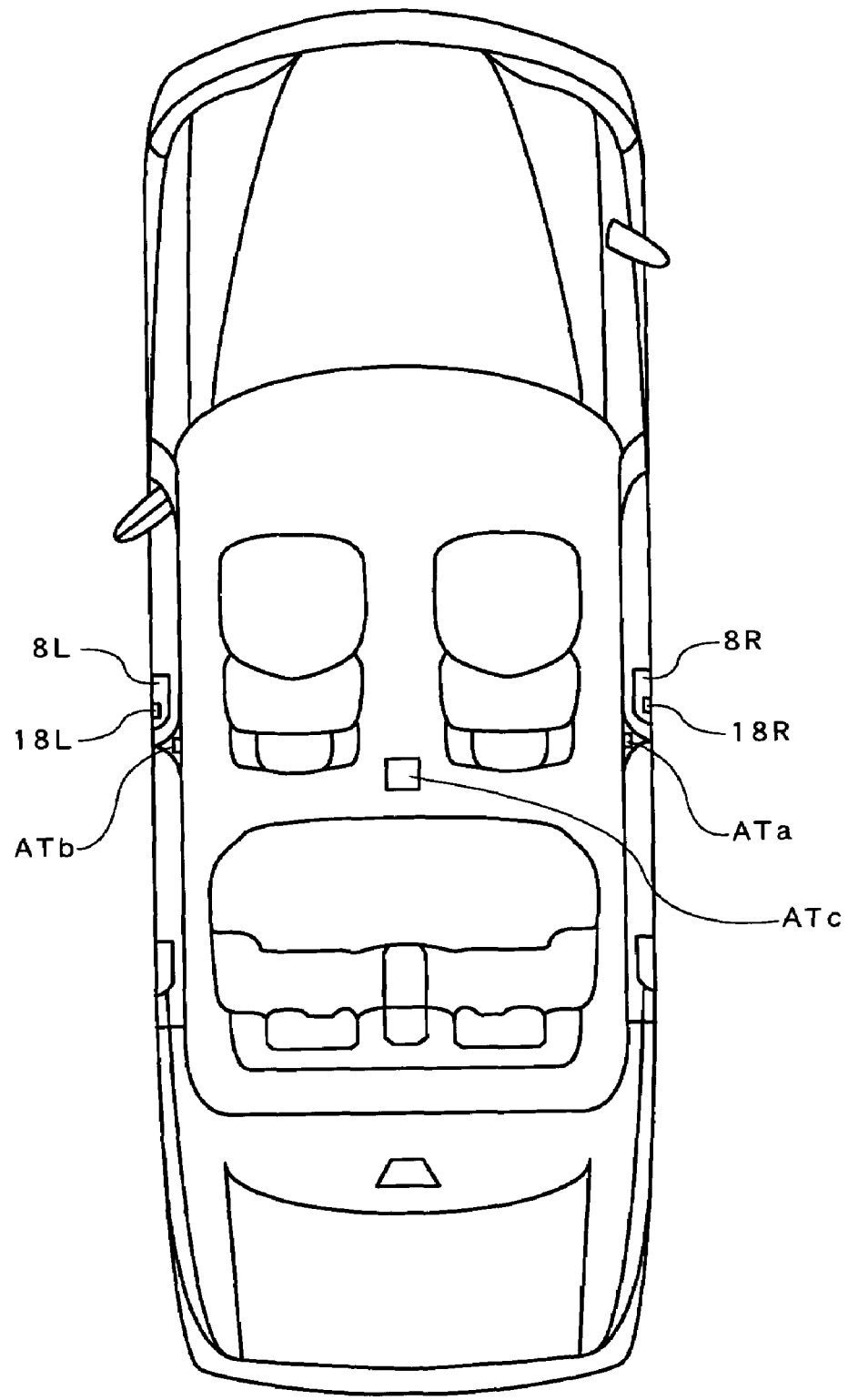
FIG. 2 is a diagram showing antenna allocation on the vehicle.

Referring to FIG. 2, touch sensors 8R, 8L are operated when the door is unlocked and provided on outer handles on the driver's seat and passenger seat for detecting a contact of human body on each outer handle. Lock switches 18R, 18L are operated when any door is locked and provided on the outer handles on the driver's seat and passenger seat. Detection signals from the touch sensors 8R, 8L and operation signals from the lock switches 18R, 18L are inputted to a control unit 10.

An antenna ATa is provided in the vicinity of the outer handle on the driver's seat. An antenna ATb is provided in the vicinity of the passenger seat. An antenna ATc is provided substantially in the center portion of the vehicle compartment. The control unit 10 transmits a request signal RQ from the respective antennas ATa, ATb, ATc of LF transmitters 11a, 11c, 11d at a predetermined timing described later in response to a starting trigger sent from the starting trigger generator 9.

The control unit 10 transmits a request signal from the antenna ATa of the LF transmitter 11a to a predetermined zone (effective transmission zone Ata in FIG. 3) on the driver's seat around the vehicle body in response to inputs of the detection signal from the touch sensor 8R and the operation signal from the lock switch 18R. Further, it transmits a request signal from the antenna ATb of the LF transmitter 11b to a predetermined zone (effective transmission zone B in FIG. 3) on the passenger seat side around the vehicle body in response to inputs of the detection signal from the touch sensor 8L and the operation signal from the lock switch 18L.

An RF transmitter/receiver 14 receives a response signal transmitted from the portable unit 2 in response to the transmitted request signal. The control unit 10 compares an ID code contained in the received response signal with an ID code stored preliminarily in itself and if both of them coincide with each other or in a predetermined relationship, instructs a door lock unit 12 to lock or unlock. The control unit 10, if the detection signal of the touch sensors 8R, 8L is inputted, instructs the door lock unit to unlock and if the operation signal of the lock switches 18R, 18L is inputted, instructs the door lock unit to lock. The door lock unit 12 outputs an unlocking signal or a locking signal to a door lock actuator 13 in response to an instruction from the control unit 10.

The door lock actuator 13 unlocks the door in response to a unlocking signal and locks in response to a locking signal. An ignition switch 15 and an accessory switch (ACC) 16 detect that a key inserted into an ignition key cylinder is turned up to a predetermined position. A key switch 17 detects that a key is inserted into the ignition key cylinder.

A door lock knob switch 19 is provided on each door lining within the vehicle compartment. If it is pressed down manually (door lock knob switch ON), it is locked and if it is pulled up (door lock knob switch OFF), it is unlocked. The door lock knob switch 19 is pressed down or pulled up in interlocking with the locking or unlocking of the door by the lock actuator 13. According to this embodiment, the door lock knob switch 19 is a switch located within the vehicle compartment, constituting a door locking/unlocking state detector.

In the portable unit 2, its LF receiver 22 receives a request signal transmitted from respective LF transmitters 11a to 11c of the on-vehicle unit 1. The controller 23 instructs the RF transmitter/receiver 21 to transmit an ID code in response to receiving of the request signal. The RF transmitter/receiver 21 sends back a response signal including the ID code in response to an instruction from the controller 23.

Figure 3:
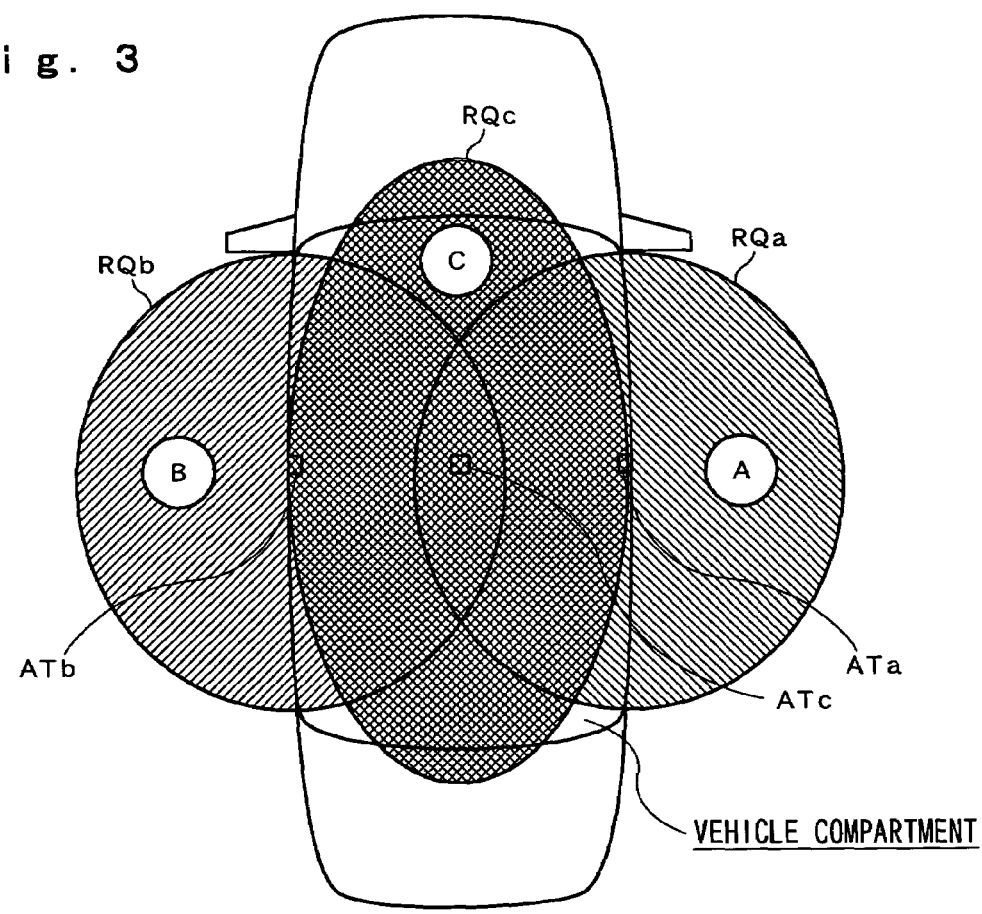
FIG. 3 is a diagram showing schematically an effective transmission zone of an LF transmission circuit.

FIG. 3 is a diagram showing schematically the effective transmission zones A, B, C of the request signals RQa, RQb, RQc transmitted from the respective antennas ATa, ATb, ATc of the on-vehicle unit 1.

The antenna ATa transmits RQa to an effective transmission zone A (predetermined zone around the vehicle) having a radius of 90 to 100 cm around the outer handle in the driver's seat or its. The antenna ATb transmits RQb to an effective transmission zone B (predetermined zone around the vehicle) having a radius of 90 to 100 cm around the outer handle of a passenger seat or its vicinity. The antenna ATc transmits RQc to an effective transmission zone C constituted of the vehicle compartment.

According to this embodiment, the antenna ATc whose effective transmission zone of the request signal is limited to substantially the vehicle compartment is employed as an internal antenna while antennas ATa, ATb whose effective transmission zone of the request signal includes a predetermined zone out of the vehicle compartment are employed as external antennas.

Figure 4:
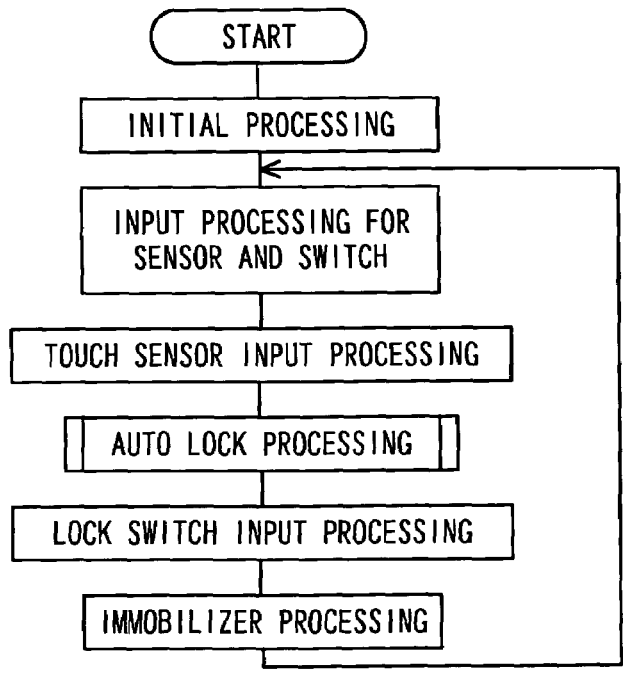
FIG. 4 is a flow chart showing the procedure of back ground processing including "auto-lock processing" to be executed in the automatic locking system of the present invention.

FIG. 4 is a flow chart showing the procedure of the back ground processing including the "auto-lock processing" to be executed in the wireless automatic locking/unlocking device of the present invention, which is repeatedly executed in a predetermined cycle.

In the "initialization processing", initial values are set to various kinds of variables, timer, counter and the like. In the "input processing in sensor and switch", a signal detected by each sensor on the vehicle and state of each switch are read out. In the "touch sensor input processing", if the touch sensors 8R, 8L provided on the door handle detect a contact on that door handle, the LF transmitter 11a or 11b on the contact detection side of the on-vehicle unit 1 executes bi-directional communication with the portable unit 2 so as to execute certification processing and if an approach by user carrying a proper portable unit 2 is certified, the door locking is released.

In the "auto-lock processing", as described in detail later, when the door is opened or closed, the on-vehicle unit 1 recognizes the position of the portable unit 2 and if no response signal from the portable unit 2 is received, the door is automatically locked.

In the "lock switch input processing", when the lock switches 18R, 18L are operated, the LF transmitter 11a or 11b on the operated door executes bi-directional communication with the portable unit 2 so as to carry out certification processing. If it is certified that this operation is an operation by user carrying the proper portable unit 2, the door is locked.

In the "immobilizer processing", when the ignition switch 15 is turned ON, the on-vehicle unit 1 and the portable unit 2 execute bi-directional communication so as to carry out certification processing. If it is certified that this is ON operation by user carrying the proper portable unit 2, engine start is permitted.

Next, the "auto-lock processing" will be outlined with reference to a flow chart shown in FIG. 5 and its detail will be described with reference to flow chars shown in FIGS. 6, 7, 8.

Figure 5:
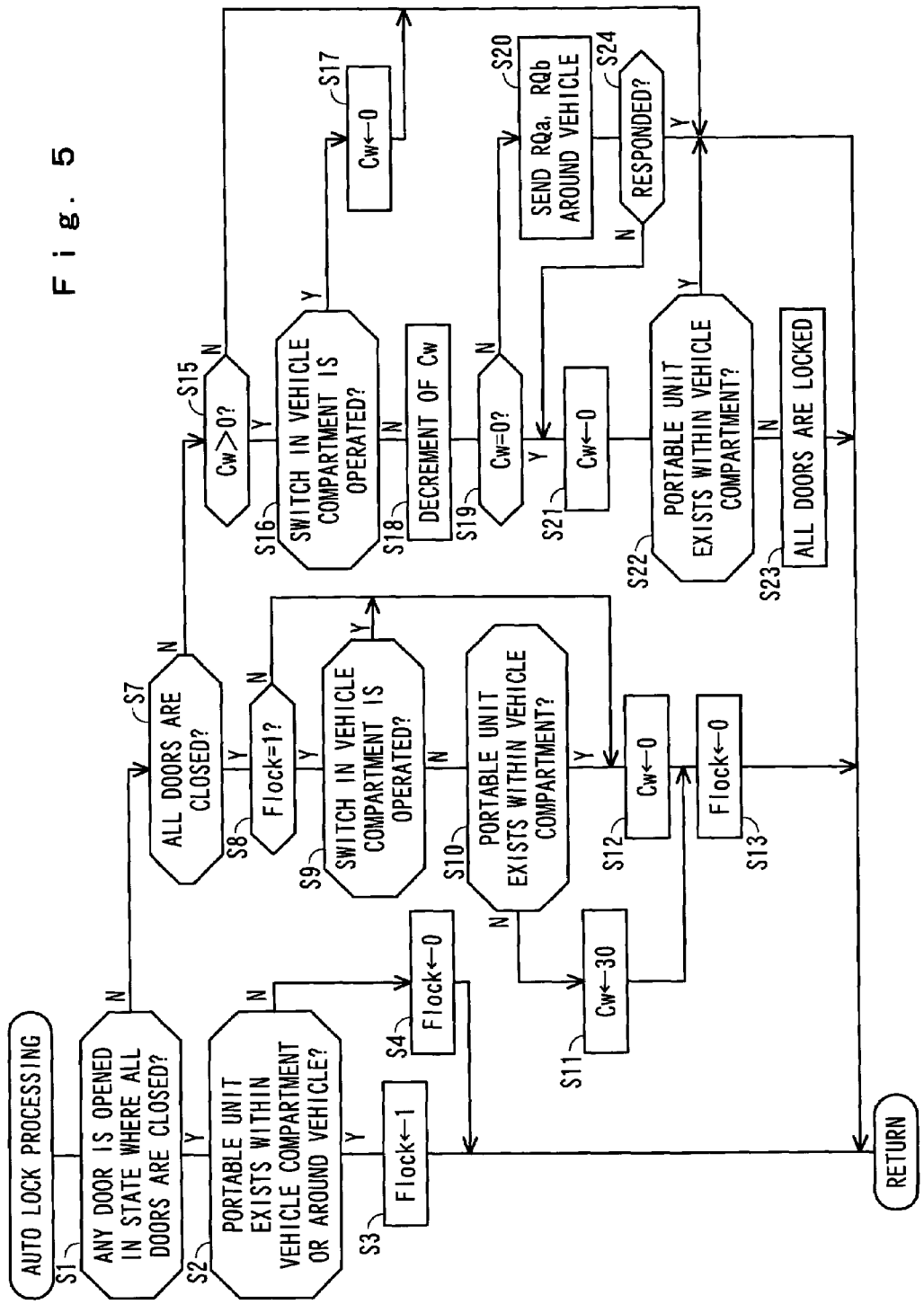
FIGS. 5, 18 are flow charts showing schematically the "auto-lock processing"

In step S1 shown in FIG. 5, whether or not any door is opened from a state in which all doors are closed is determined based on a presence/absence of the starting trigger signal. If any door is opened, in step S2, RQa, RQb, RQc are transmitted into the respective effective transmission zones A, B, C successively from the respective antennas ATa ATb, ATc of the LF transmitters 11a, 11b, 11c. The on-vehicle unit 1 recognizes a current position of the portable unit 2 based on the fact that a response signal corresponding to any request signal is sent back.

Figure 6:
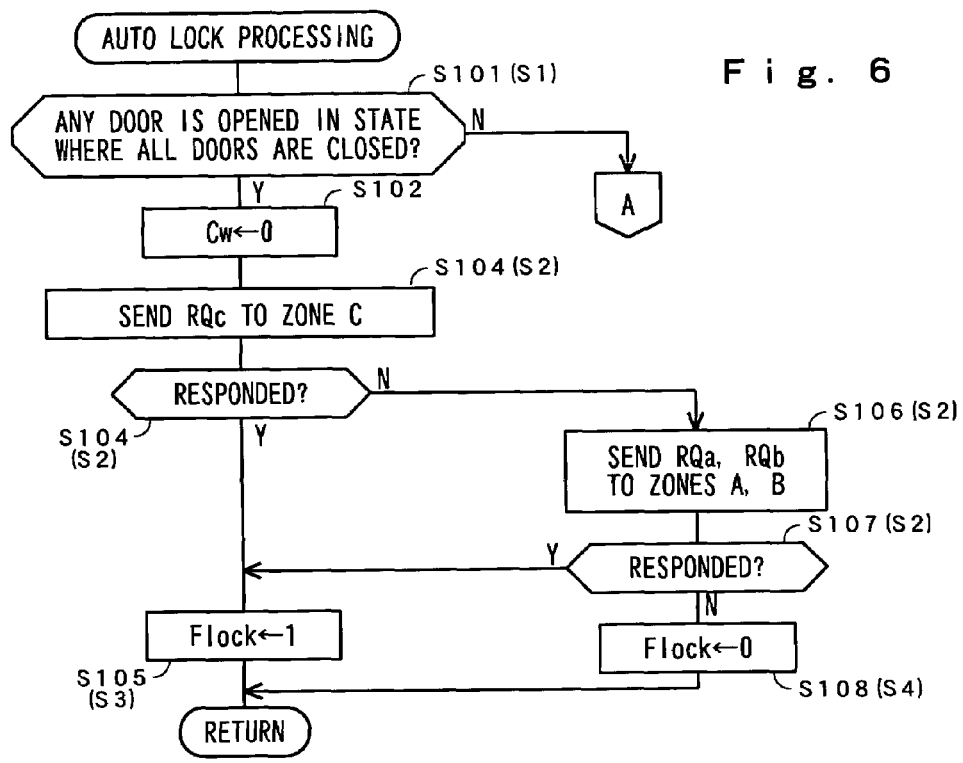
FIGS. 6, 7, 8, 19, 20, 21 are flow charts showing the "auto-lock processing" in detail.
Figure 7:
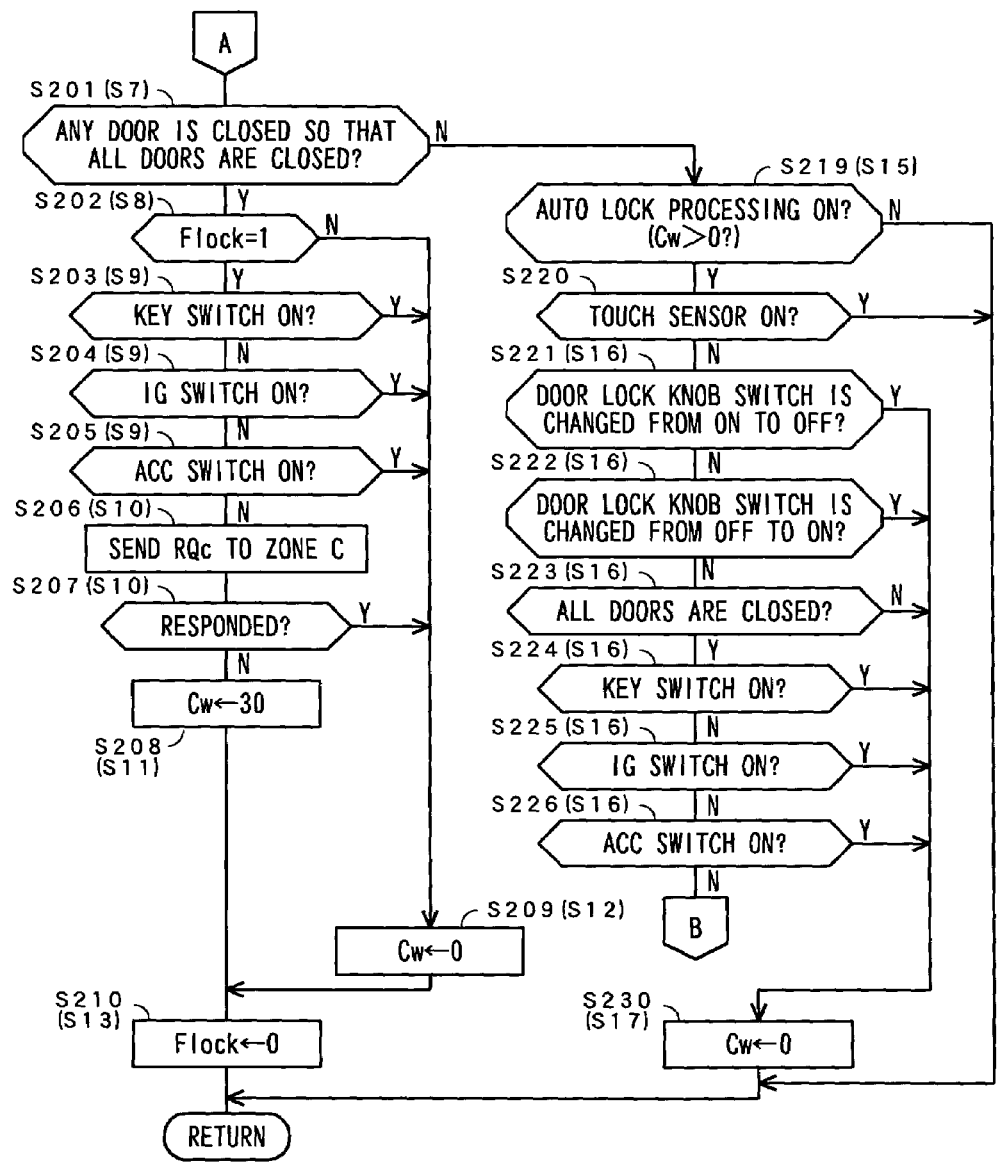
Figure 8:
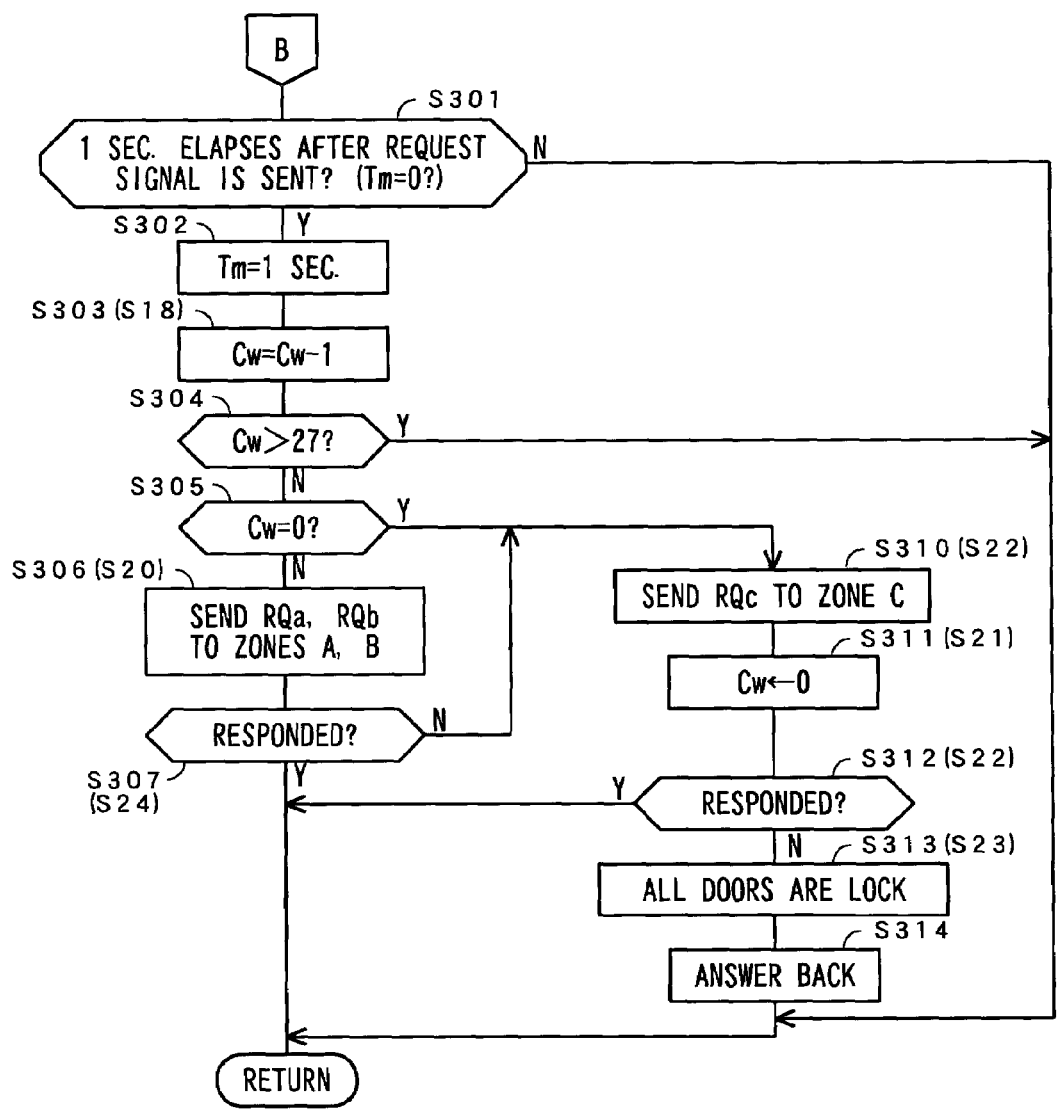

The explanation about the auto-lock processing or "sending back of a response signal (to a request signal)" in FIGS. 6 to 8 notes that as a result of comparing an ID code included in a received response signal with an ID code stored in the control unit 10, both the signals coincide with each other or are in a predetermined relationship, or a regular ID code is sent back. According to this embodiment, whether or not a proper portable unit exists within an effective transmission zone of the request signal is determined depending on whether or not the regular response signal can be received.

If the portable unit 2 exists within the vehicle compartment or in the vicinity of the door, when any door is opened in a condition that all the doors are closed, it is determined that user of the portable unit 2 exists in the vicinity of the door or within the vehicle compartment or user of the portable unit 2 exists around the vehicle and the processing proceeds to step S3. In step S3, a terminal existence recognizing flag Flock indicating whether or not user of the portable unit 2 exists around the vehicle is set (=1). That is, it is recognized that the portable unit 2 exists around the vehicle.

If the portable unit 2 does not exist within or around the vehicle, the aforementioned flag Flock is reset (=0) in step S4. That is, it is recognized that user of the portable unit 2 does not exist around the vehicle.

According to this embodiment, if the terminal existence recognizing flag Flock is set up, automatic locking is executed under a condition that other conditions are met. If the flag Flock is reset, automatic locking is prohibited unconditionally.

In a next cycle, in step S1, whether or not any door is just opened under the condition that all the doors are closed is determined. If the other case is determined, the processing proceeds to step S7. Determination of step S1 turns to "positive" only if any door is just opened under the condition that all the doors are closed and the determination turns to "negative" when another door is opened under a condition that one or more doors are opened or when one or more doors remain opened.

In step S7, whether or not opened doors are closed so that fully closed state is attained is determined. If it is determined that the fully closed state is attained, in step S8, whether or not user of the portable unit exists around the vehicle is determined based on the flag Flock. If it is determined that user exists around the vehicle (Flock=1), the processing proceeds to step S9. Determination of step S7 turns to positive only when all the doors are closed (a moment) in a condition that any door is opened. It turns to negative when all the doors remain closed or two or more doors remain open while one of them is closed.

In step S9, whether or not various kinds of switches within the vehicle compartment are operated is determined. If operation of the switches is detected, it is determined that some people exist within the vehicle compartment and because auto-lock is unnecessary, the processing proceeds to step S12. As opposed to this, if operation of the switches is not detected, the auto-lock processing is continued and the processing proceeds to step S10.

In step S10, the LF transmitter 11c sends RQc to the vehicle compartment or in the effective transmission zone C shown in FIG. 3 from the LF transmitter 11C. Whether or not the portable unit 2 exists within the vehicle compartment is determined depending on whether or not the response signal (response signal) is sent back.

Unless the portable unit 2 exists within the vehicle compartment, from door OPEN to door CLOSED is determined to be "door opening and closing for the user of the portable unit to get out of the vehicle" and the processing proceeds to step S11 in order to execute auto-lock. In step S11, transition to auto lock is permitted and then, the number of transmitting the request signal intermittently is set in the auto lock counter Cw. According to this embodiment, because the request signal is transmitted 30 times a second after the door is closed, "30" is set in the counter Cw.

If in step S10, it is determined that the portable unit 2 exists within the vehicle compartment, from door OPEN to door CLOSE is "door opening/closing for the user of the portable unit to ride on the vehicle". It is determined that auto lock is unnecessary and the processing proceeds to step S12. In step S12, the counter Cw is reset. In step S13, because the necessity of auto lock for a current door closing has been determined, the flag Flock is reset.

If in a next cycle, the processing proceeds to step S15 through the steps S1, S7, whether or not auto lock processing is continued is determined based on a count value of the counter Cw. If the count value is zero, the current processing is terminated because automatic locking is not permitted. If the counter Cw indicates other value than 0, it is determined that auto lock processing is continued and the processing proceeds to step S16.

In step S16, whether or not any switch in the vehicle compartment is operated is determined. If the operation of the switch is detected, it means that user other than the user of the portable unit 2 is staying in the vehicle and thus, it is determined that automatic locking is unnecessary and the processing proceeds to step S17. In step S17, the counter Cw is reset. As a result, auto lock processing is canceled.

Unless the operation of the switch is detected, in step S18, the count value of the counter Cw is decremented every predetermined time. According to this embodiment, the counter is preliminarily set to be decremented every second. In step S19, whether or not intermittent transmission of the request signal is terminated is determined based on the count value of the counter Cw. Because it is initially determined that it is not terminated, the processing proceeds to step S20.

In step S20, RQa and RQb are transmitted into the effective transmission zones A, B from the respective antennas ATa, ATb of the LF transmitters 11a, 11b. In step S24, whether or not the portable unit 2 exists around the vehicle is determined depending on whether or not response signal is sent back to the request signal. Because user of the portable unit 2 exists around the vehicle just after the door is closed and the response signal is sent back, this processing is terminated.

In a sequent cycle, in step S19, if it is certified that the count value of the counter Cw is zero (that is, intermittent transmission number of the request signal reaches 30 times or it takes 30 seconds after all the doors are closed) or if it is determined that the portable unit 2 does not exist around the vehicle in step S24, the processing proceeds to step S21.

In step S21, the counter Cw is reset. In step S22, RQc is transmitted within the vehicle compartment (effective transmission zone C) from the antenna ATc of the LF transmitter 11c to make sure, whether or not the portable unit 2 exists within the vehicle compartment is determined based on whether or not response signal is sent back. If it is recognized that the portable unit 2 does not securely exist within the vehicle compartment, auto lock is executed in step S23 and all the doors are locked.

According to this embodiment, if any door is opened in a condition that all the doors are closed and again all the doors are closed, the necessity of auto lock is determined depending on whether or not the portable unit 2 exists within the vehicle compartment. If auto lock is unnecessary, auto lock is prohibited in steps S12, S13, the request signal for automatic locking is not transmitted from the on-vehicle unit 1. That is, step S20 is not executed. Therefore, no request signal is transmitted to the portable unit 2 of a vehicle driver or the like within the vehicle compartment and a response action of that portable unit 2 is unnecessary. Thus, waste consumption of electricity is prevented.

FIGS. 6, 7, 8 are flow charts showing the detail of the "auto lock processing". The same step numbers as described above are attached to the same processings as described above.

In step S101, whether or not any door is just opened in the condition that all the doors are closed is determined. If any door is just opened, the counter Cw is reset (=0) in step S102. In step S103, RQc is transmitted from the antenna ATc of the LF transmitter 11c covering the vehicle compartment as the effective transmission zone (C). In step S104, whether or not the portable unit 2 exists within the vehicle compartment is determined depending on whether or not response signal is sent back from the portable unit 2 in response to the RQc. If the response signal is received, it is determined that the portable unit exists within the vehicle compartment and the processing proceeds to step S105. In step S105, the flag Flock is set (=1).

If the on-vehicle unit 1 cannot receive the response signal, it is determined that the portable unit 2 does not exist within the vehicle compartment and the processing proceeds to step S106. In step S106, first, RQa is transmitted from the antenna ATa of the LF transmitter 11a to the effective transmission zone (A) in the vicinity of a door on the driver's seat side. Next, RQb is transmitted from the antenna ATb of the LF transmitter 11b to the effective transmission zone (B) in the vicinity of a door on the passenger seat side. In step S107, whether or not the portable unit 2 exists is determined depending on whether or not the response signal is sent back from the portable unit 2 in response to the respective RQa, RQb.

If the response signal is received, it is determined that the portable unit 2 exists in the vicinity of the door and the processing proceeds to step S105. Unless the response signal can be received, it is determined that the portable unit 2 does not exist in the vicinity of the door as well and the processing proceeds to step S108. In step S108, the flag Flock is reset.

In step S101, if it is not determined that any door is opened in a condition that all the doors are closed, the processing proceeds to step S201 in FIG. 7. In step S201, whether or not all the doors are closed so that fully closed state is attained from a state in which any door is opened is determined.

If it is detected a moment that all the doors are just closed, in step S202, the aforementioned flag Flock is referred. If this flag Flock is in reset state, auto lock is impermissible and therefore the processing proceeds to step S209. In step S209, the counter Cw is reset.

In step S202, if it is determined that the flag Flock is set, it is recognized that user of the portable unit 2 exists around the vehicle when any door is opened, and automatic locking is permitted. Thus, the processing proceeds to step S203.

In step S203, whether or not a key is inserted into the ignition key cylinder is determined. Unless the key is inserted, the processing proceeds to step S204. In step S204, whether or not the ignition switch is ON is determined. If it is OFF, the processing proceeds to step S205. In step S205, whether or not the accessory (ACC) switch is ON is determined.

In the case of the OFF state, in order to determine which this door opening/closing operation is executed for user of the portable unit 2 to ride on the vehicle or to get out of the vehicle based on whether or not the portable unit 2 exists within the vehicle compartment, the processing proceeds to step S206. If any switch is ON, some people exist within the vehicle compartment and therefore, the processing proceeds to step S209 so as to prohibit auto lock.

In step S206, RQc is transmitted from the antenna ATc of the LF transmitter 11c to the effective transmission zone (C) in the vehicle compartment. In step S207, whether or not the portable unit 2 exists within the vehicle compartment is determined depending on whether or not response signal is sent back in response to this RQc. If the response signal is received, the portable unit 2 exists within the vehicle compartment when all the door is closed. That is, it is determined that user of the portable unit 2 rides on the vehicle and the processing proceeds to step S209, in which current automatic locking is prohibited.

If the response signal is not received, it is determined that when all the doors are closed, the portable unit 2 does not exist in the vehicle compartment, that is, user of the portable unit 2 gets out of the vehicle, the processing proceeds to step S208. In step S208, the counter Cw is set to "30". In step S210, the flag Flock is reset.

In a next cycle, after the steps S101, S201, the processing proceeds to step S219.

In step S219, the counter Cw is referred and because the count value is initially larger than zero, the processing proceeds to step S220. In step S220, whether or not the touch sensor provided on the outer door handle is ON is determined and if it is OFF, the processing proceeds to step S221. In steps S221, S222, whether or not the door lock knob switch 19 is operated is determined and if it is operated, the processing proceeds to step S230 and otherwise, the processing proceeds to step S223.

In the meantime, as described previously, according to this embodiment, the door lock knob switch 19 is employed as door locking/unlocking state detector. Therefore, step S222 indicates that the door locking condition is detected.

In step S223, whether or not all the doors are closed is determined. If all the doors are closed, the processing proceeds to step S224 and if any door is opened, the processing proceeds to step S230. In steps 224, 225, 226, the states of the key switch, ignition switch and accessory switch are determined as in the above and if any one is ON, the processing proceeds to step S230, in which the counter Cw is reset. If all the switches are OFF, the processing proceeds to step S301 in FIG. 8.

In step S301, in order to specify an intermittence internal of the request signal sent intermittently, whether or not a second elapses after a previous request signal is sent is determined. If the intermittent transmission timer Tm is zero, it is determined that a second elapses and the processing proceeds to step S302. In step S302, "a second" is set in the intermittent transmission timer Tm and then, down-count is started again. In step S303, the counter Cw is decremented by only 1.

In step S304, the counter Cw is referred. Here if user of the portable unit 2 opens the door to get out of the vehicle and then closes the door, he or she exists in the vicinity of the door for about three seconds empirically. According to this embodiment, in order to further reduce power consumption of the portable unit 2 by skipping first three intermittent transmissions (count values of the counter Cw are 30, 29, 28) of the request signal unconditionally, the count value is compared with "27" (that is, equivalent to 27 seconds) in step S304. If the count value is not greater than 27, the current processing is terminated and if it is smaller than "27", the processing proceeds to step S305. This step S304 may be eliminated as required.

In step S305, the counter Cw is referred again and because the Cw is not zero at first, the processing proceeds to step S306. In step S306, like the aforementioned step S106, RQa and RQb are transmitted from the respective antennas ATa, ATb of the LF transmitters 11a, 11b to the effective transmission zones (A, B) in the vicinity of the door. If the response signal is received in step S307, the current processing is terminated to continue auto lock processing.

Unless the response signal can be received in step S307, user of the portable unit 2 does not exist in a predetermined zone around the vehicle and thus, the processing proceeds to step S310. Further, even if it is determined that the value of the counter Cw is "0" when the counter Cw is referred in step S305, the processing proceeds to step S310. According to this embodiment, as shown in steps S208, S301 to S303 and S305, the counter Cw and the intermittent transmission timer Tw constitute a timer which starts counting corresponding to closing of the opening/closing body.

In step S310, in order to prevent the portable unit 2 from being left in the vehicle compartment, RQc is sent again from the antenna ATc to the effective transmission zone (C) within the vehicle compartment to make sure. In step S311, the counter Cw is reset. In step S312, whether or not the response signal is sent back in response to the RQ is determined. If the response signal is sent back, the auto lock processing is completed without executing automatic locking.

Unless the response signal is sent back, all the doors are locked immediately in step S313. That is, automatic locking is executed. In step S314, an answer-back is executed by blinking a hazard lamp or the like in order to notify user outside the vehicle of it that the door undergoes automatic locking. After that, the auto lock processing is completed.

FIGS. 9, 10, 11, 12 are diagrams showing the operation of the auto lock processing and the operation will be described with reference to a flow chart of FIG. 5.

Figure 9:
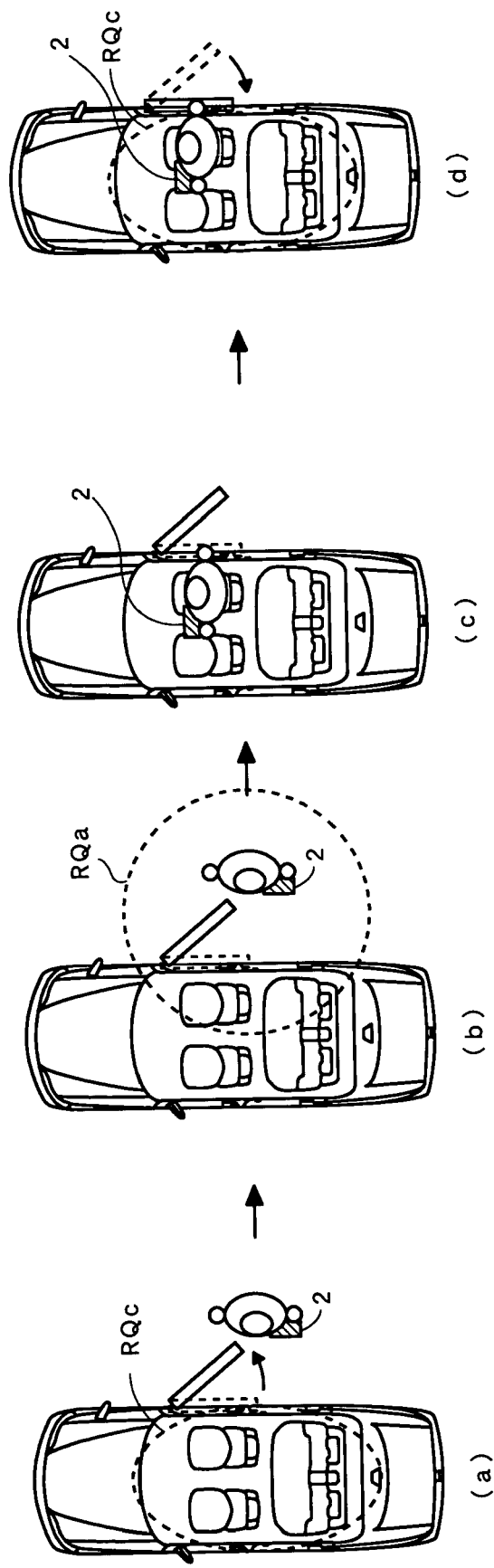
FIG. 9 is a diagram showing the operation of an automatic locking system when user of the portable unit rides on it.

FIG. 9 is a diagram showing the operation when user of the portable unit 2 rides on a vehicle. If user opens the driver's seat side door, this action is detected in step S1 in FIG. 5 and the processing proceeds to step S2, in which the RQc is sent to the vehicle compartment (effective transmission zone C) [FIG. 9(a)] and then, RQa, RQb are transmitted to the effective transmission zones A, B. Because the portable unit 2 exists in the vicinity of the driver's seat side door, the portable unit 2 sends back the response signal in response to the RQa [FIG. 9(b)]. Therefore, the RQb is not transmitted. In step S3, the flag Flock is set.

If user rides on the vehicle [FIG. 9(c)] and closes the driver's seat door so that all the doors are closed, this state is detected in step S7 of FIG. 5 and the processing proceeds to step S10, in which the RQc is sent again to the vehicle compartment (effective transmission zone C) [FIG. 9(d)]. Here, it is determined that the portable unit 2 exists within the vehicle compartment, meaning that user is riding and therefore in steps S12, S13, automatic locking is prohibited and the intermittent transmission of the request signal after that is prohibited.

Figure 13:
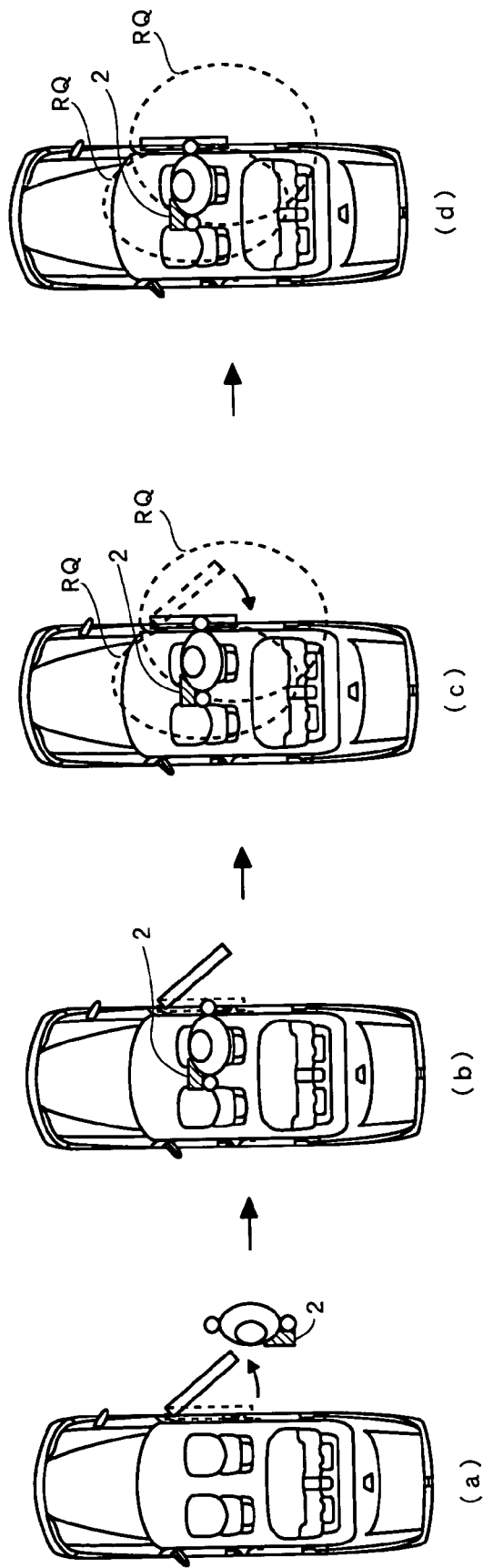
FIG. 13 is a diagram showing the operation of the conventional art when user of the portable unit rides on the vehicle.

According to this embodiment, when all the doors are just closed after any door is open, a request signal is transmitted to the vehicle compartment and which user of the portable unit 2 rides on the vehicle or gets out of it is determined depending on whether or not the response signal from the portable unit is received in response to this request signal. If it is determined that user rides on it, the transmission of the request signal after that is prohibited. Thus, not only the faults described about FIG. 13 are solved but also waste consumption of a battery in the portable unit 2 due to an unnecessary response action can be prevented.

Figure 10:
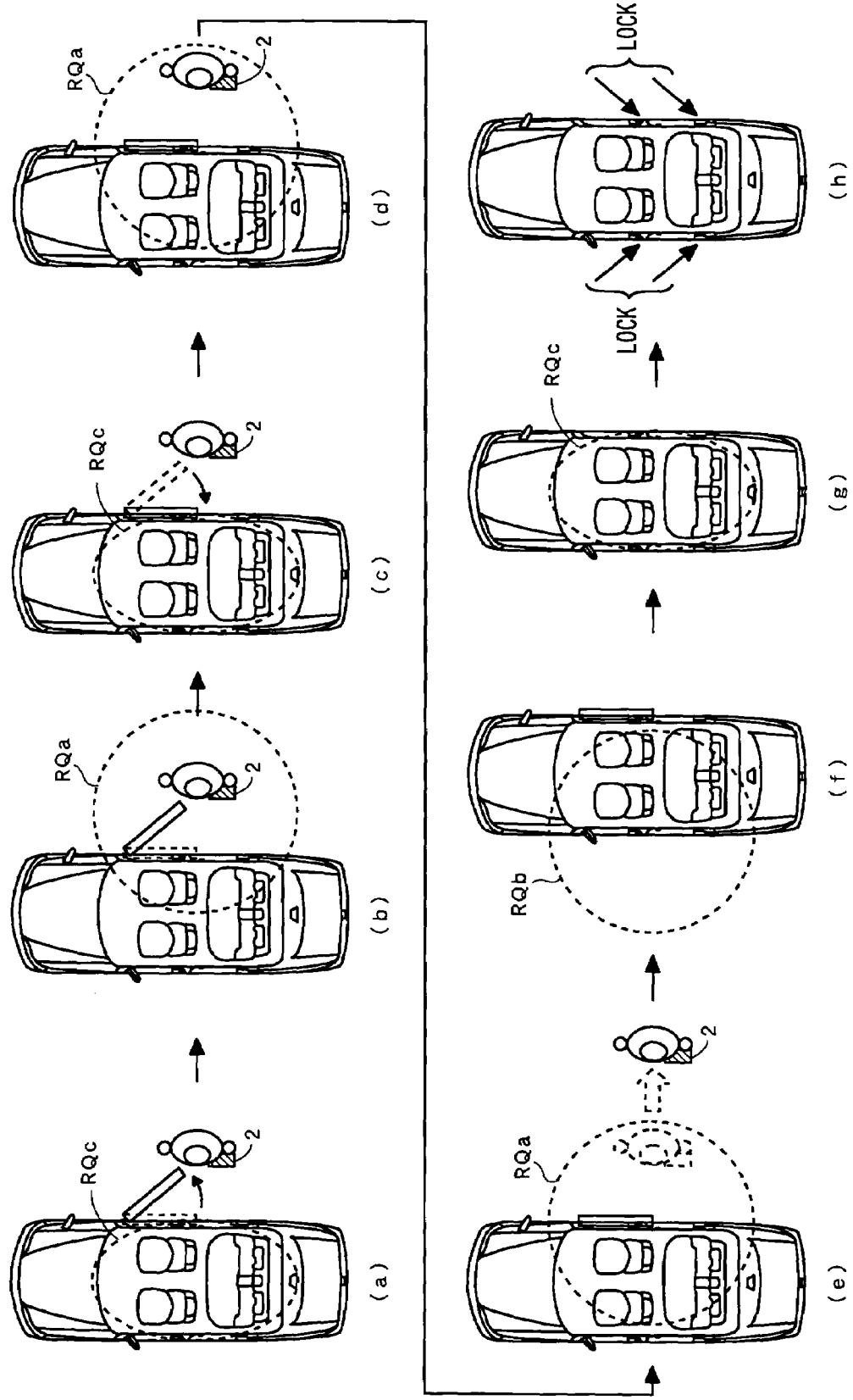
FIG. 10 is a diagram showing the operation of the automatic locking system when the user of the portable unit does not ride but leaves although the door is opened.

FIG. 10 is a diagram showing the operation when user of the portable unit 2 leaves without riding the vehicle although he or she opens the door.

If user opens the driver's seat side door, this action is detected in step S1 and the processing proceeds to step S2, in which the RQc is sent to the vehicle compartment (effective transmission zone C) [FIG. 10(a)] and then, RQa, RQb are sent to the effective transmission zones A, B. Because the portable unit 2 exists in the vicinity of the driver's seat side door, the portable unit 2 sends back the response signal in response to the RQa [FIG. 10(b)]. In step S3, the flag Flock is set.

If user closes the door without riding on it so that all the doors are closed, this state is detected in step S7 and the processing proceeds to step S10, in which the RQc is sent again to the vehicle compartment (effective transmission zone C) [FIG. 10(c)]. Here, because it is determined that the portable unit 2 does not exist within the vehicle compartment, in step S12, "30" is set in the counter Cw as an intermittent transmission number, thereby allowing intermittent transmission of the request signal after that.

Next, the processing proceeds to step S20 through steps S15, S16, S18 so that intermittent transmission of RQa, RQb to the effective transmission zones A, B is started. Because at this time, the portable unit 2 sends back the response signal corresponding to the RQa [FIG. 10(d)], this processing is terminated as it is. After that, user leaves the vehicle and if in step S20 of a next cycle, the portable unit 2 is out of the effective transmission zone of the RQa, RQb [FIG. 10(e), (f)], in step S22, the RQc is sent within the vehicle compartment [FIG. 10(g)]. If no response occurs from the portable unit 2 in response to this RQc, in step S23, all the doors are automatically locked [FIG. 10(h)].

Figure 11:
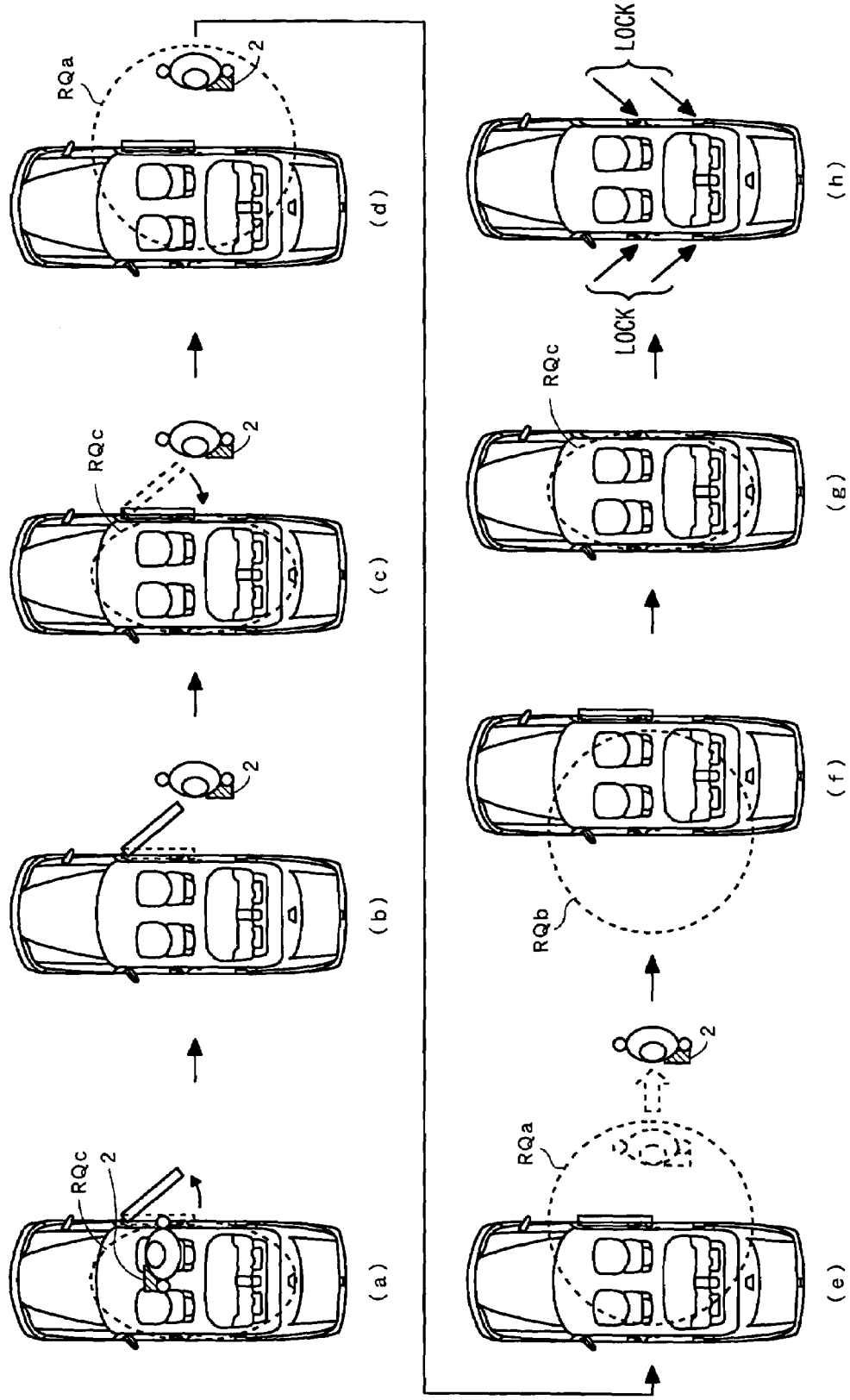
FIG. 11 is a diagram showing the operation of the automatic locking system when the user of the portable unit gets out of the vehicle and leaves the vehicle.

FIG. 11 is a diagram showing the operation when user of the portable unit 2 gets out of the vehicle and leaves it.

If user opens the driver's seat side door, this is detected in step S1 and the processing proceeds to step S2, in which the RQc is sent to the vehicle compartment (effective transmission zone C) [FIG. 11(a)]. Here, because the portable unit exists within the vehicle compartment, the portable pone 2 sends back the response signal in response to the RQc. Therefore, the RQ, RQb to be sent to the effective transmission zones A, B are not sent. In step S3, the flag Flock is set.

If user gets out of the vehicle [FIG. 11(b)] and then closes the driver's seat door so that all the doors are closed, this is detected in step S7 and the processing proceeds to step S10, in which the RQc is sent to the vehicle compartment [FIG. 11(c)]. Because it is determined that no portable unit exists within the vehicle compartment and user is located out of the vehicle, "30" is set in the counter Cw as an intermittent transmission number in step S12 and after that, the intermittent transmission of the request signal is permitted.

Next, the processing proceeds to step S20 through steps S15, S16, S18 so that intermittent transmission of RQa, RQb to the effective transmission zones A, B is started. Because at this time, the portable unit 2 sends back the response signal corresponding to the RQa [FIG. 11(d)], this processing is terminated as it is. After that, user leaves the vehicle and if in step S20 of a next cycle, the portable unit 2 is out of the effective transmission zone of the RQa, RQb [FIGS. 11(e), (f)], in step S22, the RQc is sent within the vehicle compartment [FIG. 11(g)]. If no response occurs from the portable unit 2 in response to this RQc, in step S23, all the doors are automatically locked [FIG. 11(h)].

Figure 12:
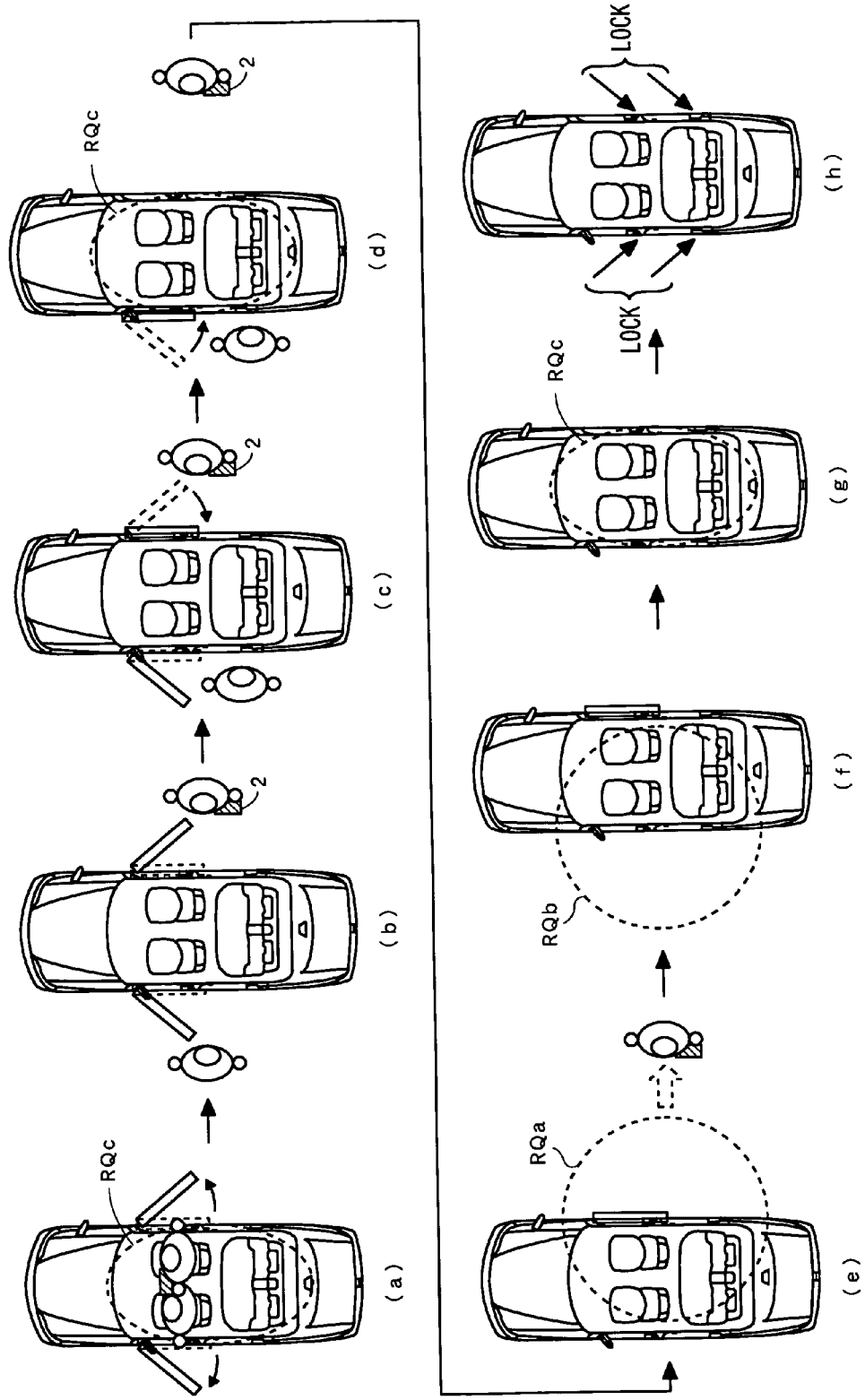
FIG. 12 is a diagram showing the operation of the automatic locking system when user of a portable unit and a passenger carrying no portable unit get out of a vehicle and leave it.

FIG. 12 is a diagram showing the operation when user of the portable unit 2 and a passenger carrying no portable unit get out of the vehicle and leave it.

If user or the passenger opens a door of the driver's seat or a passenger seat when all the doors are closed, this is detected in step S1 and the processing proceeds to step S2.

In step S2, the RQc is sent to the vehicle compartment (effective transmission zone C) [FIG. 12(a)]. Because the portable unit 2 exists within the vehicle compartment, the portable unit 2 sends back the response signal in response to the RQc. Therefore, the RQa, RQb to be transmitted to the effective transmission zones A, B are not transmitted. In step S3, the flag Flock is set.

If user and the passenger get out of the vehicle [FIG. 12(b)] and after the driver's seat side door is closed [FIG. 12(c)], the passenger's seat side door is closed so that all the doors are closed, this is detected in step S7 of FIG. 5 and the processing proceeds to step S10, in which the RQc is transmitted to the vehicle compartment [FIG. 12(d)]. Here, because it is determined that the portable unit 2 does not exist within the vehicle compartment and user is located out of the vehicle, "30" is set in the counter Cw as intermittent transmission number in step S12. After that, the intermittent transmission of the request signal is permitted.

Next, this processing proceeds to step S20 through the steps S15, 16, 18, in which intermittent transmission of the RQa, RQb to the effective transmission zones A, B is started [FIGS. 12(e), (f)]. At this time, user has already left the vehicle and therefore the response signal is not sent back from the portable unit 2 in response to the RQa, RQb. Thus, the processing proceeds from step S21 to step S22, in which the RQc is sent to the vehicle compartment again [FIG. 12(g)]. Because no response comes from the portable unit 2, all the doors are locked in step S23 [FIG. 12(h)].

Figure 14:
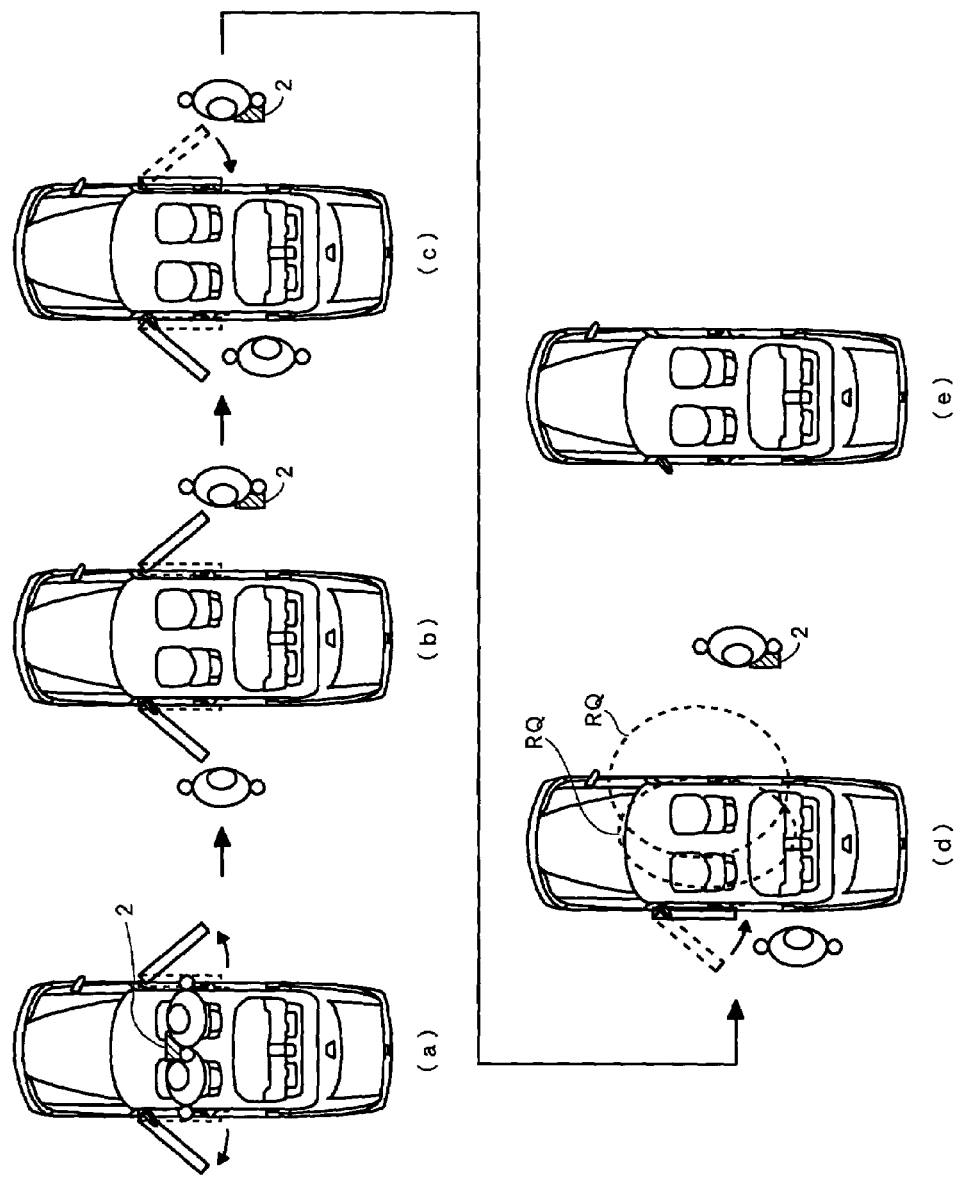
FIG. 14 is a diagram showing the operation of the conventional art when user of the portable unit and passenger carrying no portable unit get out of the vehicle and leave it.

As described above, according to this embodiment, whether or not user of the portable unit 2 exists around the vehicle is determined not at a timing that all the doors are closed, but at a timing that any door is just opened under the condition that all the doors are closed. Thus, the faults described about FIG. 14 can be eliminated. Thus, automatic locking of the doors is securely carried out regardless of the presence/absence of a passenger, that is, regardless of the order about door closing operation by the passenger and door closing operation by user. Thus, even if a passenger exists, user does not need to take care of the door closing operation (order of closing operation of respective doors) by the passenger, thereby improving the reliability of automatic locking and its convenience.

In the above-described respective embodiments, an application example on auto lock processing in which a request signal is sent intermittently to a predetermined zone around the vehicle and if the response signal which is a response cannot be received, the lock is turned ON has been described. However, needless to say, these embodiments can be applied to an auto lock processing in which a request signal is sent to a predetermined zone around the vehicle a predetermined time after the opening/closing of the opening/closing body and if the response signal which is its response cannot be received, the lock is turned ON, as disclosed in Japanese Patent Application Laid-Open No.SHO60-164571.

Further, in the respective embodiments, the on-vehicle unit 1 determined whether or not the portable unit which sends back the response signal is a proper portable unit based on whether or not a predetermined ID code is included in the response signal sent back to a transmitted request signal.

Figure 15:
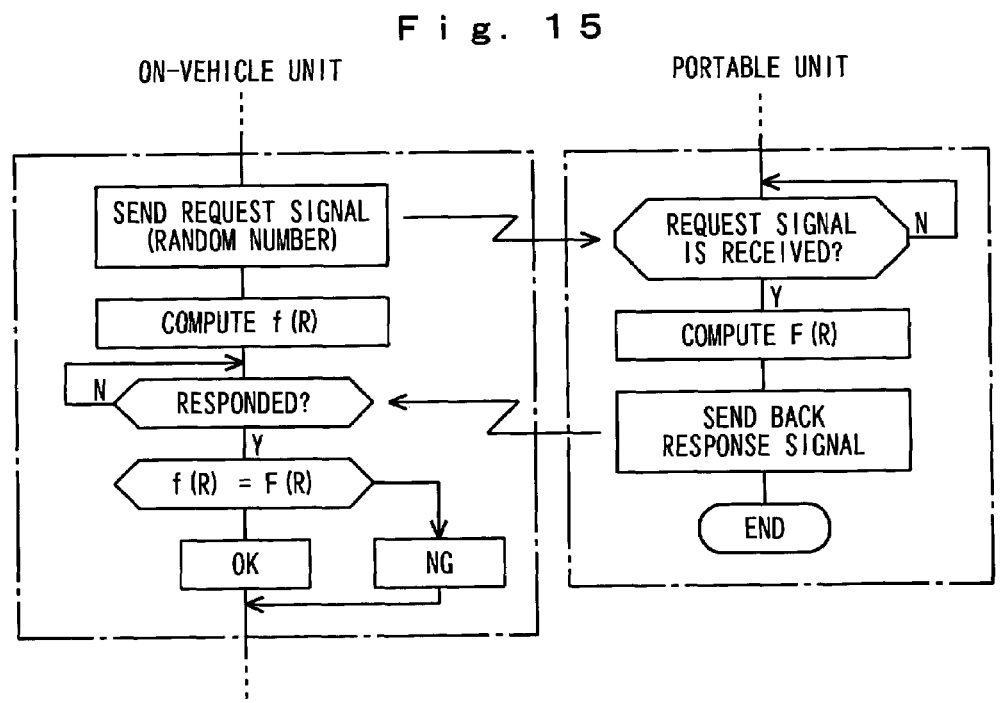
FIG. 15 is a flow chart showing other method by which the on-vehicle unit certifies a portable unit.

As disclosed in Japanese Patent Application Laid-Open No.SHO59-58031 and shown in FIG. 15, however, it is permissible to store a function or a predetermined coding rules f(x), F(x) in the on-vehicle unit 1 and the portable unit 2 so that the request signal is a random number R and ID code signal is F(R) and when a relationship of f(r)=F(R) is established, certify that the portable unit is of a valid type.

It is permissible to combine a conventional example with a product described in Japanese Patent Application Laid-Open NO.SHO59-58031 or modify the product disclosed in the Japanese Patent Application Laid-Open No.SH059-58031 appropriately.

Figure 16:
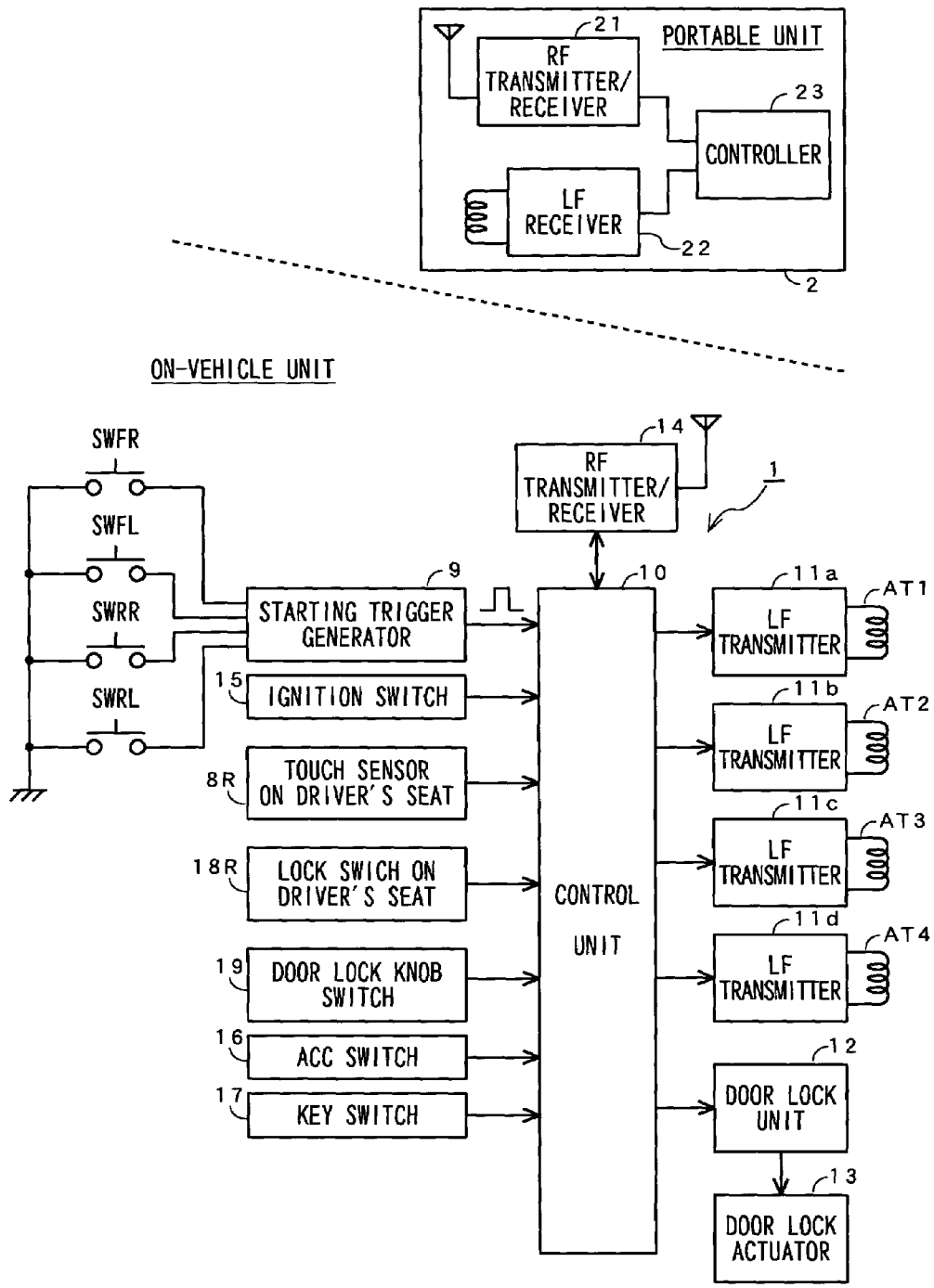
FIG. 16 is a diagram expressing schematically the antenna allocation of the second embodiment of the present invention and effective transmission zone of request signal transmitted from the respective antennas.

FIG. 16 is a block diagram showing the configuration of the wireless locking/unlocking device according to a second embodiment of the present invention. The same reference numerals as described previously indicate the same components. According to this embodiment, four LF transmission circuits 11a, 11b, 11c, 11d are provided and antennas AT1 to AT4 are provided on the respective LF transmission circuits.

Figure 17:
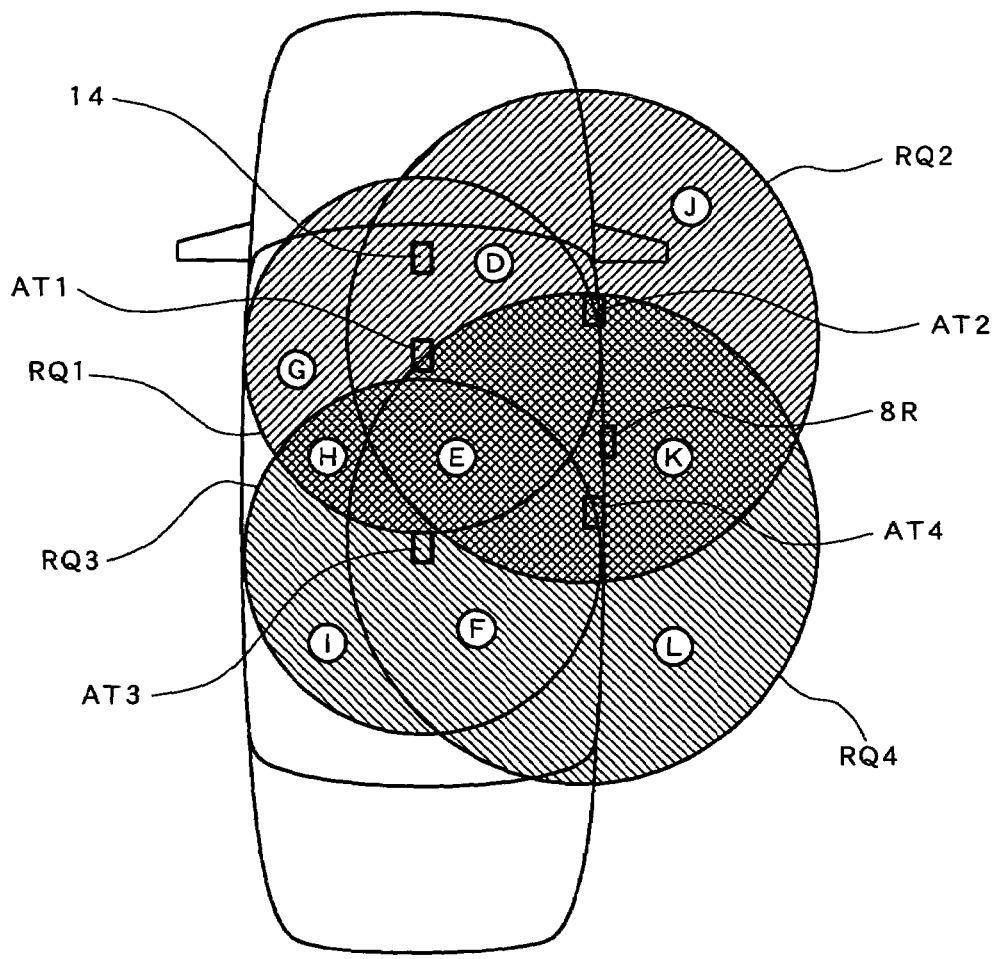
FIG. 17 is a flow chart showing the procedure of back ground processing to be executed in wireless automatic locking/unlocking unit of the present invention.

FIG. 17 is a diagram expressing schematically an antenna allocation and effective transmission zones (predetermined zone around the vehicle) of the request signal transmitted from the antennas AT1 to AT4 according to the second embodiment of the present invention. According to this embodiment, the internal antennas AT1, AT2 are disposed at the front portion and in the center of the vehicle compartment and the external antennas AT2, AT4 are disposed in front of the front door and rear door on the driver's seat side.

The internal antenna AT1 sends RQ1 to an effective transmission zone around the front portion of the vehicle. The internal antenna AT3 sends RQ3 to an effective transmission zone around the rear portion of the vehicle. The external antenna AT2 sends RQ2 to an effective transmission area having a radius of 90 to 100 cm around the driver's door. The external antenna AT4 transmits RQ4 to an effective transmission zone having a radius of 90 to 100 cm around the driver's bihind door. The driver side touch sensors 8R detectes a contact of human body on driver's outer handle.

In the meantime, a zone D in this diagram is a zone in which only RQ1, RQ2 are detected. A zone E is a zone in which all RQ1 to RQ4 are detected. A zone F is a zone in which only the RQ3, RQ4 are detected. A zone G is a zone in which only the RQ1 is detected. A zone H is a zone in which only the RQ1 and RQ3 are detected. A zone I is a zone in which only the RQ3 is detected. A zone J is a zone in which only the RQ2 is detected. A zone K is a zone in which only the RQ2 and RQ4 are detected. A zone L is a zone in which only the RQ4 is detected.

Next, the operation of the second embodiment will be described along a flow chart. In this embodiment also, the back ground processing described with reference to FIG. 4 is executed repeatedly by a predetermined cycle and in that, "auto lock processing" is executed.

Here, the outline of the "auto lock processing" of the second embodiment will be described with reference to the flow chart of FIG. 18 and its detail will be described with reference to flow charts of FIGS. 19 to 22 and a timing chart of FIG. 23.

Figure 18:
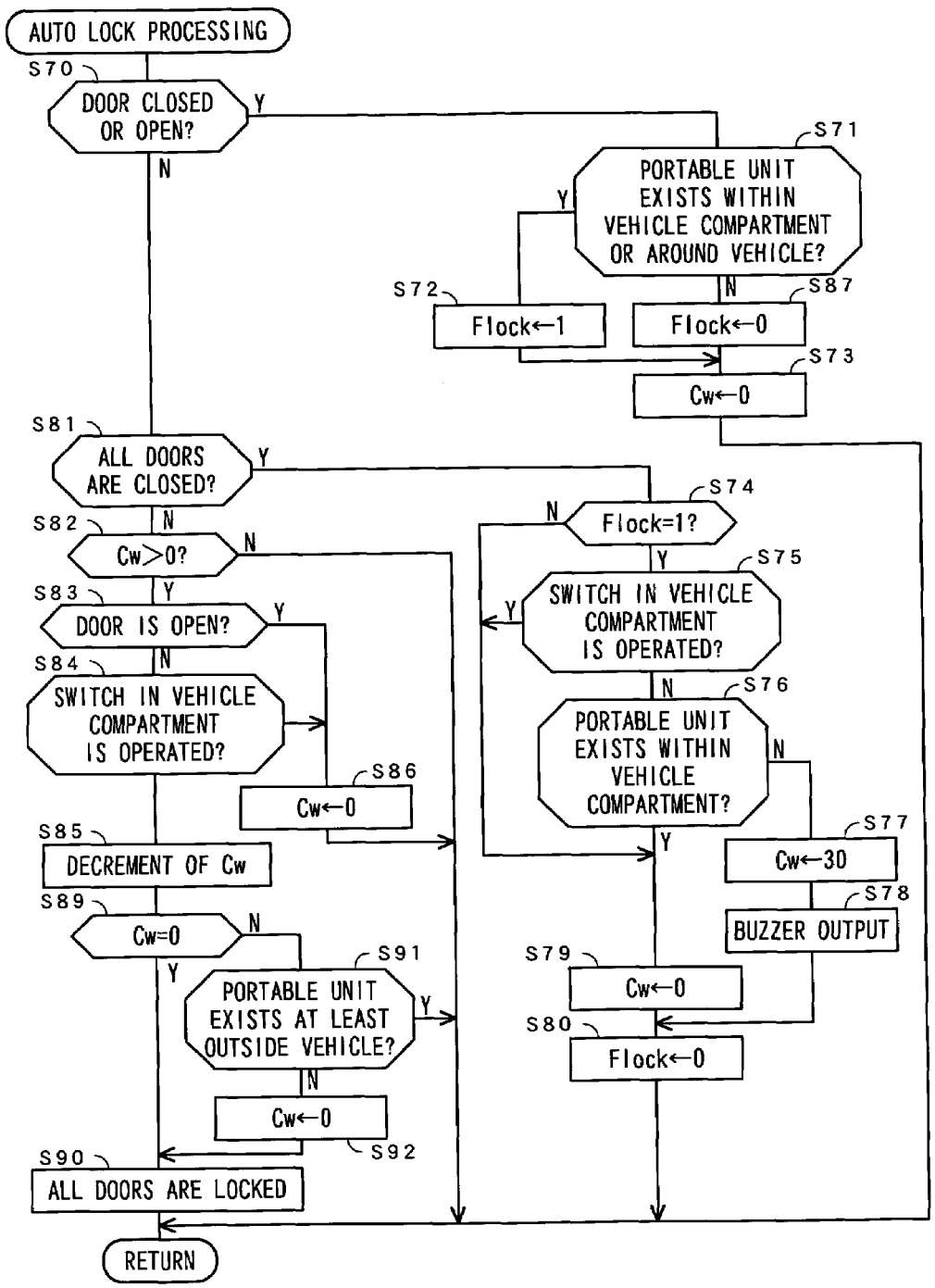

In step S70 of FIG. 18, whether or not any door is just opened under the condition that all the doors are closed is determined. If any door is opened, the processing proceeds to step S71, in which RQ1 to RQ4 are transmitted alternately in the order of internal antenna, external antenna, internal antenna . . . from the respective antennas AT1 to AT4 repeatedly. The on-vehicle unit 1 determines which the portable unit 2 exists within the vehicle compartment or around the vehicle depending onto which request signal the response signal is sent back.

If the portable unit 2 exists within the vehicle compartment or around the vehicle, it is determined that user of the portable unit 2 exists in the vicinity of the door or within the vehicle compartment when the door is opened and the processing proceeds to step S72. In step S72, the flag Flock is set (=1). That is, that user of the portable unit 2 exists around the vehicle when the door is opened is registered.

Unless the portable unit 2 exists within the vehicle compartment or around the vehicle, the flag Flock is reset in step S87. After that, in any case, the processing proceeds to step S73, in which the counter Cw is reset and this current cycle is terminated.

In a next cycle, the processing proceeds from step S70 to step S81. That is, the determination in step S70 turns to "positive" only when any door is just opened under the condition that all the doors are closed. The determination turns to "negative" when under the condition that one or more doors are already opened, another door is opened or one or more doors remains opened.

In step S81, whether or not opened door is just closed so that fully closed state is attained is determined. If it is determined that the fully closed state is attained, in step S74, whether or not user of the portable unit exists around the vehicle is determined based on the flag Flock. If it is determined that user exists around the vehicle (Flock=1), the processing proceeds to step S75.

Determination of step S81 turns to positive only when all the doors are just closed (a moment) in a condition that any door is opened. It turns to negative when all the doors remain closed or two or more doors remain open while one of them is closed.

In step S75, whether or not various kinds of switches within the vehicle compartment are operated is determined. If operation of the switches is detected, it is determined that some people exist within the vehicle compartment and because auto-lock is unnecessary, the processing proceeds to step S79. As opposed to this, if operation of the switches is not detected, the auto-lock processing is continued and the processing proceeds to step S76. In step S76, request signals are sent from the each antenna. Whether or not the portable unit 2 exists within the vehicle compartment is determined depending on whether or not the response signal response signal is sent back.

Unless the portable unit 2 exists within the vehicle compartment, from door OPEN to door CLOSED is determined to be "door opening and closing for the user of the portable unit to get out of the vehicle" and the processing proceeds to step S77 in order to execute auto-lock. In step S77, transition to auto lock is permitted and then, the number of sending the request signal intermittently is set in the auto lock counter Cw. According to this embodiment, because the request signal is sent 29 times a second after the door is closed, "30" is set in the counter Cw. In step S78, buzzer sound generates, notifying the user that auto lock mode has been attained.

If in step S76, it is determined that the portable unit 2 exists within the vehicle compartment, from door OPEN to door CLOSE is "door opening/closing for the user of the portable unit to ride on the vehicle". It is determined that auto lock is unnecessary and the processing proceeds to step S79. In step S79, the counter Cw is reset. In step S80, the flag Flock is reset.

If in a next cycle, the processing proceeds to step S82 through the steps S70, S81, whether or not auto lock processing is continued is determined based on a count value of the counter Cw. If the count value is zero, the current processing is terminated because automatic locking is not permitted. If the counter Cw indicates other value than 0, it is determined that auto lock processing is continued and the processing proceeds to step S83.

In step S83, whether or not any door remains opened is determined and if the door remains opened, the processing proceeds to step S86. If all the doors are closed, the processing proceeds to step S84, in which whether or not any switch in the vehicle compartment is operated is determined. If the switch operation is detected, it means that a person other than the user of the portable unit 2 is riding and thus it is determined that the automatic locking is unnecessary and the processing proceeds to step S86. In step S86, the counter Cw is reset. As a result, the auto lock processing is cancelled.

Unless the switch operation is detected, the processing proceeds to step S85. The count value of the counter Cw is decremented every predetermined time. According to this embodiment, it is set up that it is decremented every second. In step S89, whether or not the intermittent transmission of the request signal is terminated based on the count value of the counter Cw is determined. Because first, it is determined that the intermittent transmission is not terminated, the processing proceeds to step S91.

In step S91, a request signal is sent from the respective antennas and whether or not the portable unit 2 exists at least out of the vehicle is identified depending on whether or not the response signal is sent back to this request signal. Just after user of the portable unit 2 gets out of the vehicle and closes the door (less than 30 seconds), the existence of the portable unit 2 can be recognized outside the vehicle and thus, the current cycle is terminated.

If in step S89, in a sequent cycle, it is certified that the count value of the counter Cw is zero, the processing proceeds to step S90, in which an example of the auto lock processing is executed and all the doors are automatically locked.

If it is verified that the portable unit does not exist at least outside the vehicle in step S91 even before the count value of the counter Cw turns to "0", it comes that user of the portable unit 2 has left the vehicle and thus, after resetting the counter Cw in step S92, the processing proceeds to step S90, in which an example of the auto lock processing is executed so as to automatically lock all the doors.

According to this embodiment, by paying attention to that if user of the portable unit 2 is riding on the vehicle when all the doors are closed, the portable unit exists within the vehicle compartment, the request signal is transmitted at least within the vehicle compartment when open door is just closed so that all the doors are closed. The position of the portable unit is detected based on the response signal sent back from the portable unit in response to this request signal and riding on the vehicle or getting out of it is discriminated based on this detection result. If it is determined that the portable unit exists within the vehicle compartment and user is riding on the vehicle, transmission of the request signal is stopped. Thus, consumption of vehicle battery and portable unit battery is prevented. Further, because output of the locking signal is prohibited, automatic locking which occurs when only the passenger gets out of the vehicle is prevented.

Next, the operation of the "auto lock processing" will be described with reference to flow charts of FIGS. 19 to 22 and a timing chart of FIG. 23. In the meantime, step numbers are attached to the same or similar processing as FIG. 18 described previously.

Figure 19:
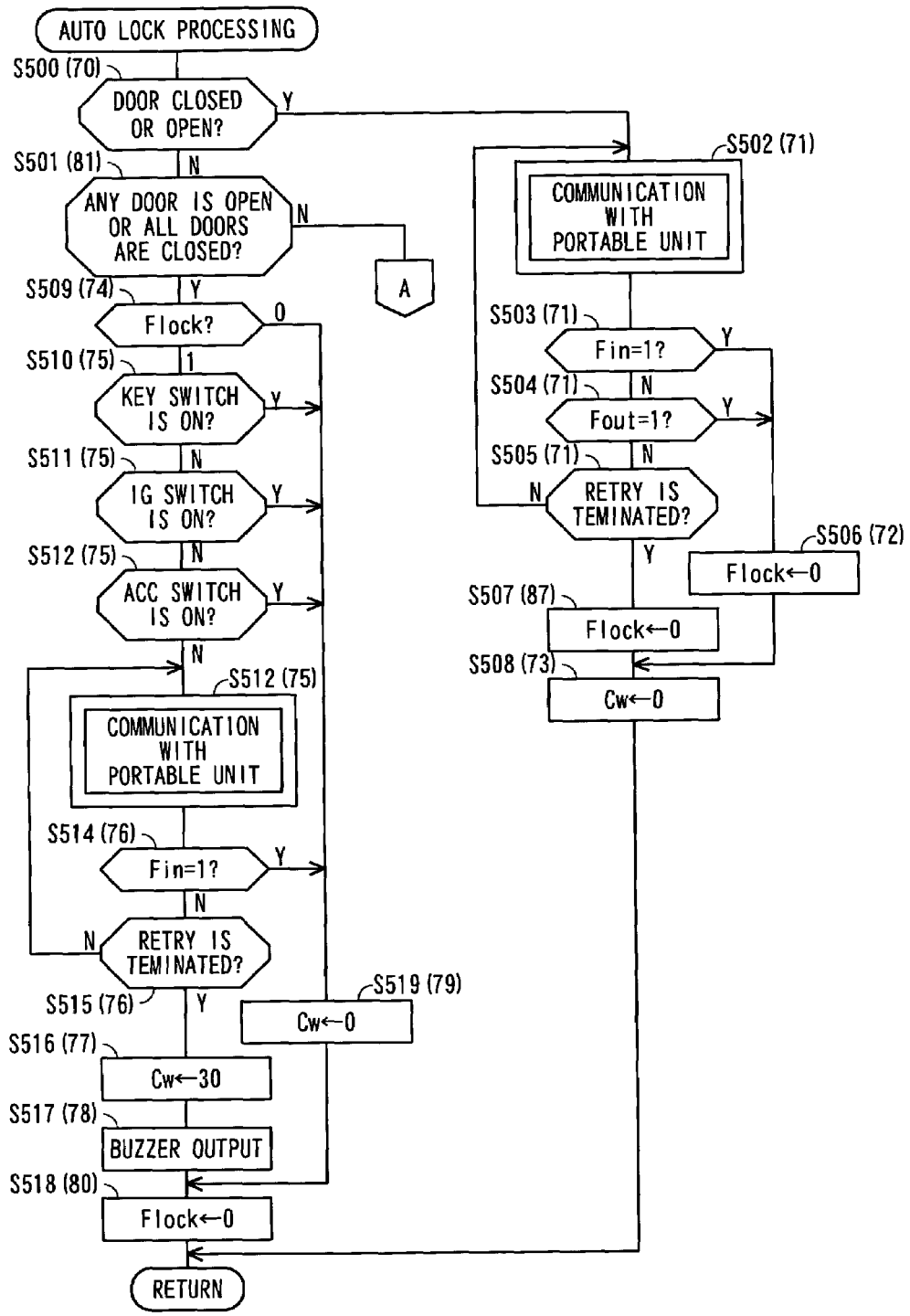

In step S500 (similar to step S70 in FIG. 18) of FIG. 19, whether or not any door is opened under the condition that all the doors are closed is determined. If door opening under the condition that all the doors are closed is detected, the processing proceeds to step S502, in which "communication inside and outside the vehicle" for detecting a current position of the portable unit 2 is executed.

Figure 22:
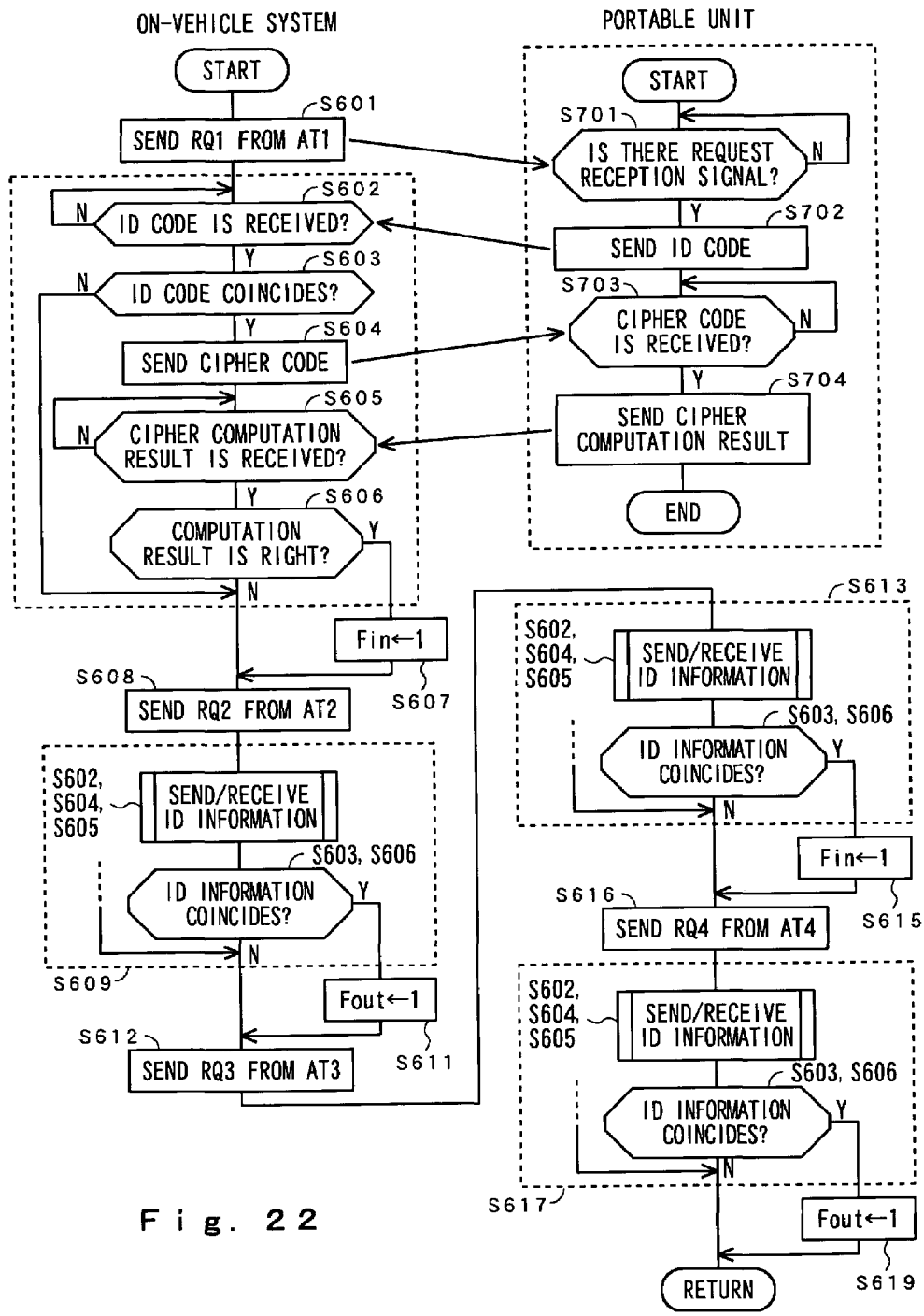
FIG. 22 is a diagram showing communication sequence of "communication outside/inside vehicle" in detail.

FIG. 22 is a diagram showing communication sequence between the on-vehicle system 1 and the portable unit 2 in the "communication inside/outside the vehicle". FIG. 23 is a timing chart showing transmission order of respective request signals.

In the on-vehicle system, in step S601, the RQ1 is transmitted from the internal antenna AT1 (time t1) and in step S602, whether or not an ID code sent back in response to this request signal is received is determined. If the portable unit 2 receives the RQ1 in step S701, it transmits its own ID code in response to this signal in step S702.

In the on-vehicle system, if the ID code is received in step S602, the received ID code is compared with the preliminarily stored ID code in step S603 and if both of them coincide with each other, a cipher code (similar to random number R in FIG. 15) is transmitted in step S604. If the portable unit 2 receives the cipher code in step S703, it executes a predetermined function computation on the cipher code in step S704 and its computation result (similar to F(R) in FIG. 15) is transmitted.

In the on-vehicle system, if the cipher computation result F(R) is received in step S605, it executes function computation on the transmitted cipher code in step S606 and the obtained cipher computation result (similar to f(R) in FIG. 15) is compared with the cipher computation result F(R) received previously. If the computation result coincides or is in a predetermined relationship (hereinafter, this relationship is called coincidence), an in-vehicle compartment flag Fin indicating that the portable unit 2 exists within the vehicle compartment is set in step S607.

Next, in step S608, the RQ2 is transmitted from the external antenna AT2 (time t2) and in step S609, transmitting/receiving processing of ID information (ID code, cipher code and cipher computation result) in steps S602, S603, S604, coincidence determination on the ID information in steps S603, S605 and processing in steps S701 to S704 are executed in the on-vehicle system 1 and the portable unit 2. If the ID information coincides (that is, the ID codes coincide and the cipher computation result is proper), a vehicle neighborhood flag Fout is set in step S611.

Likewise, in step S612, the RQ3 is transmitted from the internal antenna AT3 (time t3) and in step S613, transmitting/receiving processing of ID information in steps S602, S603, S604, coincidence determination on the ID information in steps S603, S605 and processing in steps S701 to S704 are executed in the on-vehicle system 1 and the portable unit 2. If the ID information coincides here, an in-vehicle compartment flag Fin is set in step S615.

Likewise, instep S616, the RQ4 is transmitted from the external antenna AT4 (time t4) and in step S617, transmitting/receiving processing of ID information in steps S602, S603, S604, coincidence judgment on the ID information in steps S603, S605 and processing in steps S701 to S704 are executed in the on-vehicle system 1 and the portable unit 2. If the ID information coincides here, a vehicle neighborhood flag Fin is set in step S619.

As described above, according to this embodiment, the RQ1 to RQ4 are transmitted within the vehicle compartment and around the vehicle alternately and this is repeated by a predetermined time until the portable unit 2 is detected (S505 in FIG. 19). Thus, even if the effective transmission zone is changed by disturbance noise, the position of the portable unit can be detected accurately. Further, because the request signal is transmitted within the vehicle compartment and around the vehicle alternately, the position of the portable unit 2 can be detected in a short time.

In the conventional technology in which after the request signal is transmitted repeatedly around the vehicle, the request signal is transmitted repeatedly within the vehicle compartment, if the portable unit 2 exists within the vehicle compartment, the portable unit 2 cannot be detected before repeated transmission of the request signal around the vehicle is completed. With the above described structure, the position of the portable unit 2 can be detected only by transmitting the request signal once alternately within the vehicle compartment and outside the vehicle each.

Because according to this second embodiment, two units of the internal antennas and external antennas each are provided so as to cover the vehicle compartment and around the vehicle which are detection object zones of the portable unit, in order to cover all the predetermined zone in the vehicle compartment, the request signal is transmitted from the internal antennas AT1, AT3 and in order to cover all the predetermined zone around the vehicle, the request signal is transmitted from the external antennas AT2, AT4. Thus, according to this embodiment, the transmission timing of the request signal to be sent from each antenna is controlled as shown in FIG. 23.

However, in case where all the predetermined zone in the vehicle compartment is covered with an only one internal antenna ATc while all the predetermined zone around the vehicle is covered with two external antennas ATa, ATc, the alternate transmission of one cycle of the request signal within and outside the vehicle compartment is carried out in the order of external antenna ATa→internal antenna ATc→external antenna ATb or internal antenna ATc→external antenna ATa→external antenna ATb. That is, the alternate transmission of the request signal within and outside the vehicle compartment refers to transmission of the request signal to all the predetermined zones within the vehicle compartment and around the vehicle with only one alternate transmission, in other words, within a portable unit search range.

Returning to FIG. 19, in step S503, whether or not the portable unit 2 exists within the vehicle compartment is determined based on a result of the "transmission outside/inside the vehicle compartment". If it exists within the vehicle compartment (that is, in-vehicle compartment flag="1"), the processing proceeds to step S506, in which the flag Flock is set. If the portable unit 2 does not exist within the vehicle compartment and in step S504, it is determined that it exists around the vehicle (that is, vehicle neighborhood flag Fout="1"), the processing proceeds to step S506, in which the flag Flock is set.

Unless a response can be detected from the portable unit 2, the processing proceeds to step S505, in which respective processings from the step S502 to S504 is repeated just a predetermined time (twice according to this embodiment). That is, the processing is retried. Unless the existence of the portable unit 2 can be verified despite repeating transmission of the request signal, the processing proceeds to step S507, in which the flag Flock is reset. After that, in any case, the processing proceeds to step S508, in which the counter Cw is reset thereby prohibiting auto lock.

Unless door opening under the condition that "all the doors are closed" is detected in step S500, the processing proceeds to step S501, in which whether or not the state in which any door is opened is changed to the state in which all the doors are closed is determined.

If a transition to the state in which "all the doors are closed" is detected, the processing proceeds to step S509, in which the aforementioned flag Flock is referred to. If this flag Flock is reset, it means that auto lock is not permitted and thus the processing proceeds to step S19. Then, the counter Cw is reset and in step S518, the flag Flock is reset.

If it is determined that the flag Flock is set in the step S509, the processing proceeds to step S510 because it has been already determined that when any door is opened, user of the portable unit 2 exists around the vehicle and automatic locking is already allowed.

In step S510, whether or not any key is inserted into the ignition key cylinder is determined based on the key switch. If the key is inserted and the key switch is ON, the processing proceeds to the step S519. If the key is not inserted and the key switch is OFF, the processing proceeds to step S511. In step S511, whether or not the ignition switch is ON is determined. If it is ON, the processing proceeds to the step S519 and if it is OFF, the processing proceeds to step S512. In step S512, whether or not the accessory switch is ON is determined. If it is ON, the processing proceeds to the step S519 and if it is OFF, the processing proceeds to step 513. In step S513, the "transmission outside/inside vehicle compartment" is executed again so as to detect the position of the portable unit 2.

In step S514, based on a result of the "transmission outside/inside vehicle compartment", whether or not the portable unit 2 exists within the vehicle compartment is determined. If it exists within the vehicle compartment (Fin="1"), the processing proceeds to the step S519 because auto lock is unnecessary even if door closing is carried out after a person rides on the vehicle. Unless a response can be detected from the portable unit 2 within the vehicle, the processing proceeds to step S515, in which respective processings from the step S513 to S514 is repeated just a predetermined time (twice according to this embodiment).

Unless the portable unit 2 within the vehicle compartment can be detected despite retries of the predetermined times, the portable unit 2 does not exist in the vehicle compartment when all the doors are closed. That is, it is determined that the door closing of this time occurs after getting out of the vehicle and user of the portable unit 2 gets out, the processing proceeds to step S516. In step S516, the number of transmissions of the request signal intermittently is set in the counter Cw. Because according to this embodiment, when a second elapses after the door is closed and then it is determined that this is door closing for getting out of the vehicle, the request signal is transmitted every second, totally 29 times, "30" is set in the counter Cw. In step S517, buzzer sound generates, notifying the user that auto lock mode has been attained. In step S518, the flag Flock is reset.

Figure 20:
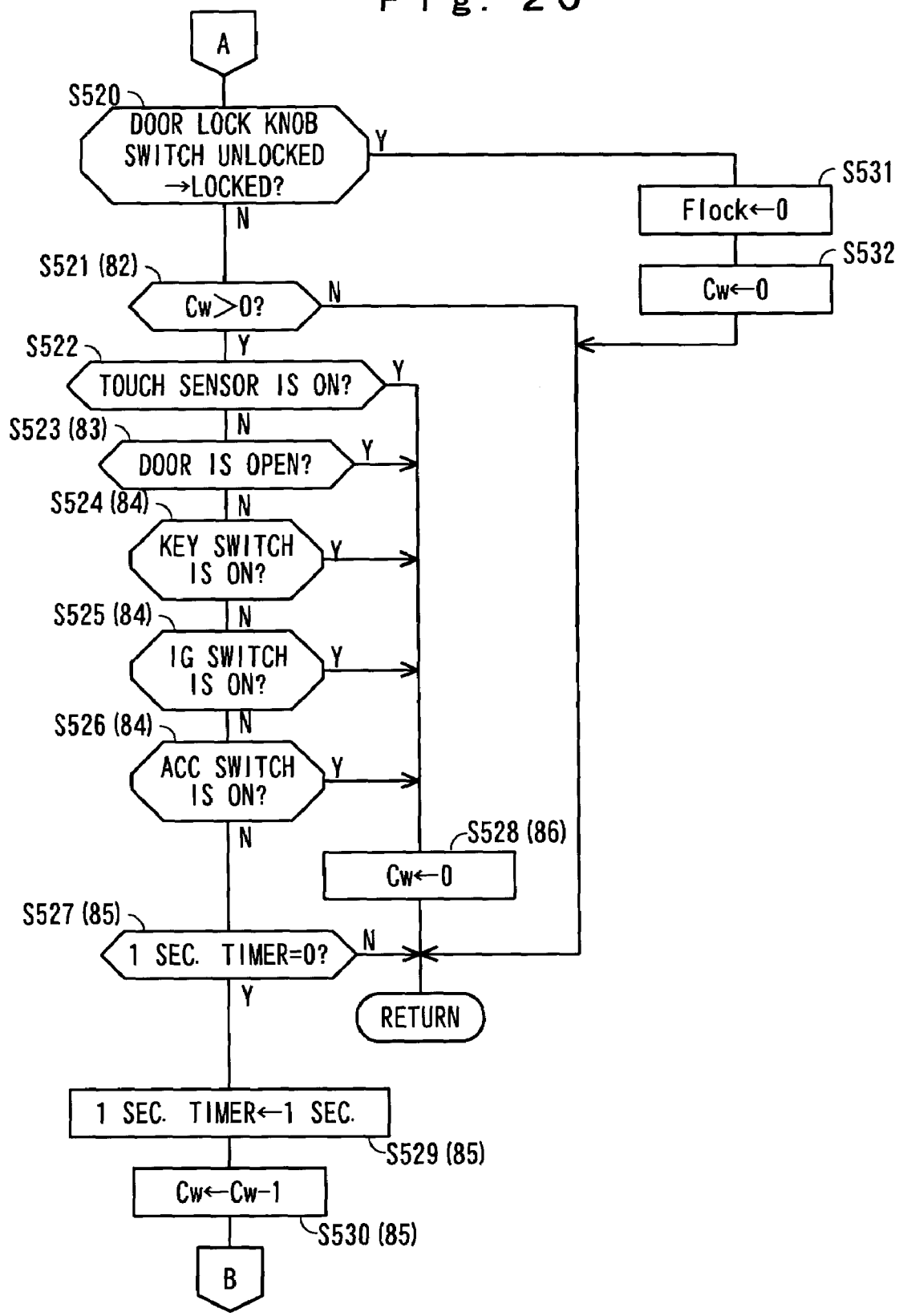

Unless a transition to the state in which all the doors are closed is detected in the step S501, the processing proceeds to step S520 in FIG. 20. In step S20, whether or not the door lock knob switch 19 is locked is determined. If it is locked, the processing proceeds to step S531, in which the flag Flock is reset. In step S532, the counter Cw is reset.

Unless the door lock knob switch 19 is locked, the processing proceeds to step S521, in which whether or not auto lock processing is being executed is determined based on the count value of the counter Cw. If the auto lock processing (Cw>0) is being executed, the processing proceeds to step S522, in which ON/OFF state of the touch sensor 8R is determined. If the touch sensor 8R is OFF, the processing proceeds to step S523, in which whether or not any door is opened is determined. If any door is opened, the processing proceeds to step S528, in which the counter Cw is reset.

If all the doors are closed, the state of the key switch (step S524), the state of the ignition switch (step S535) and the state of the accessory switch (step S526) are determined as described above and if any one is ON, the processing proceeds to step S528, in which the counter Cw is reset. If all the switches are OFF, the processing proceeds to step S527.

In step S527, a one-second timer which takes time out in a second is referred and if time out occurs, the processing proceeds to step S529, in which the one-second timer is restarted. In step S530, the counter Cw is decremented by only "1" and after that, the processing proceeds to step S535. In step S535, the counter Cw is referred and until the count value turns to "0", the processing proceeds to step S536, in which the intermittent transmission of the request signal is executed by only one cycle.

Executing a next alternate transmission of the request signal within and outside the vehicle compartment, in which the request signal is transmitted to a predetermined zone within the vehicle compartment and a predetermined zone around the vehicle, several times repeatedly when one second elapses after a previous alternate transmission thereof is defined as intermittent transmission of the request signal. Therefore, the intermittent transmission by one cycle means alternate transmission of the request signal within and outside the vehicle compartment which is usually repeated several times.

In step S536, the "transmission outside/inside vehicle compartment" is executed again so as to detect an existence of the portable unit 2. In step S537, whether or not the portable unit 2 exists within the vehicle compartment is determined based on a result of the "transmission outside/inside vehicle compartment". Although at this time, it has been already determined that the portable unit 2 does not exist within the vehicle compartment in step S514 of FIG. 19, considering a case where user of the portable unit 2 hands over the portable unit 2 to a person riding on the vehicle, in such a case, whether or not the portable unit 2 exists within the vehicle compartment is detected in order to enable the automatic locking to be prohibited by stopping transmission of the request signal.

If it is detected that the portable unit 2 does not exist within the vehicle compartment and further it is detected that the portable unit 2 does not exist around the vehicle in step S538, if this is verified after retries (two times) in step S539, the processing proceeds to step S540. In step S540, the counter Cw is reset. In step S541, all the doors are locked immediately. That is, the automatic locking is executed. In step S542, the buzzer sound generates thereby notifying user that the auto lock is completed. In step S543, answer-back such as blinking of the hazard lamp is carried out to notify user outside the vehicle that the door is automatically locked and after that, that auto lock processing is completed.

Figure 24:
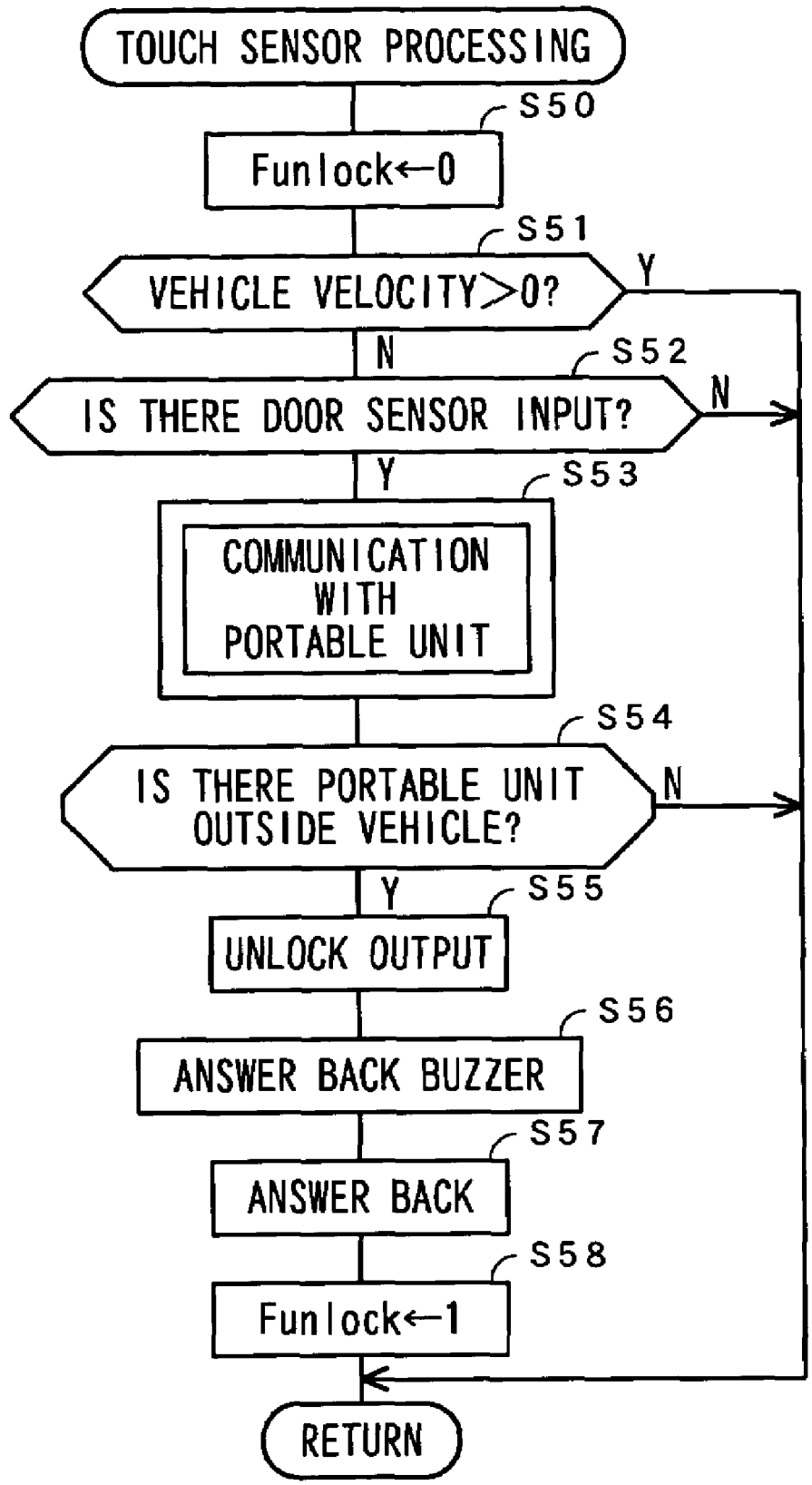
FIG. 24 is a flow chart showing the operation of "touch sensor processing"

Next, the operation of the "touch sensor processing" will be described with reference to a flow chart of FIG. 24.

In step S50, the touch sensor unlock flag Funlock is reset. In step S51, whether or not the vehicle is stopped is determined based on vehicle velocity and unless the vehicle is stopped, that processing is terminated. If the vehicle is stopped, the processing proceeds to step S52, in which the presence/absence of input from the touch sensor is determined. If the input is detected, the "transmission outside/inside vehicle compartment" is executed in step S53.

In step S54, whether or not the portable unit 2 exists around the vehicle is determined based on a determination result on the "transmission outside/inside vehicle compartment". If the portable unit exists in a predetermined zone around the vehicle and outside the vehicle, an object door is unlocked in step S55. In step S56, the buzzer sound generates thereby notifying user that the door is unlocked. In step S57, answer-back such as blinking the hazard lamp is executed in order to notify user outside the vehicle that the door is unlocked by operating the touch sensor. In step S58, the flag Funlock is set.

In the meantime, the determination in step S54 is carried out based on the position of the portable unit detected based on a result of the transmission outside/inside vehicle compartment. That is, "Portable unit exists outside vehicle compartment?" in step S540 means that the portable unit 2 does not exist in a predetermined zone within the vehicle compartment and exists only in a predetermined zone around the vehicle.

FIG. 25 is a flow chart showing an example of determination procedure of the step S54. Instep S631, whether or not the portable unit is detected within the vehicle compartment is determined. If it is detected, the processing proceeds to step S632, in which whether or not the portable unit is detected around the vehicle is determined. If it is detected, the processing proceeds to step S635, in which the portable unit exists at any position of zones D, E, F (see FIG. 17) within the vehicle compartment. Unless the portable unit is detected around the vehicle, the processing proceeds to step S634, in which it is determined that the portable unit exists at any position of the zones G, H, I within the vehicle compartment.

If it is determined that the portable unit has not been detected within the vehicle compartment in the step S631, the processing proceeds to step S633, in which whether or not the portable unit is detected around the vehicle is determined. If it is detected, the processing proceeds to step S636, in which it is detected that the portable unit is located at any position of zones J, K, L outside the vehicle compartment. If the portable unit is not detected around the vehicle, the processing proceeds to step S637, in which it is determined that the portable unit does not exist.

In the step S54, if it is determined that the portable unit is located at any position of the zones J, K, L outside the vehicle compartment in the step S636, the processing proceeds to step S55 and otherwise, the processing is terminated.

Figure 21:
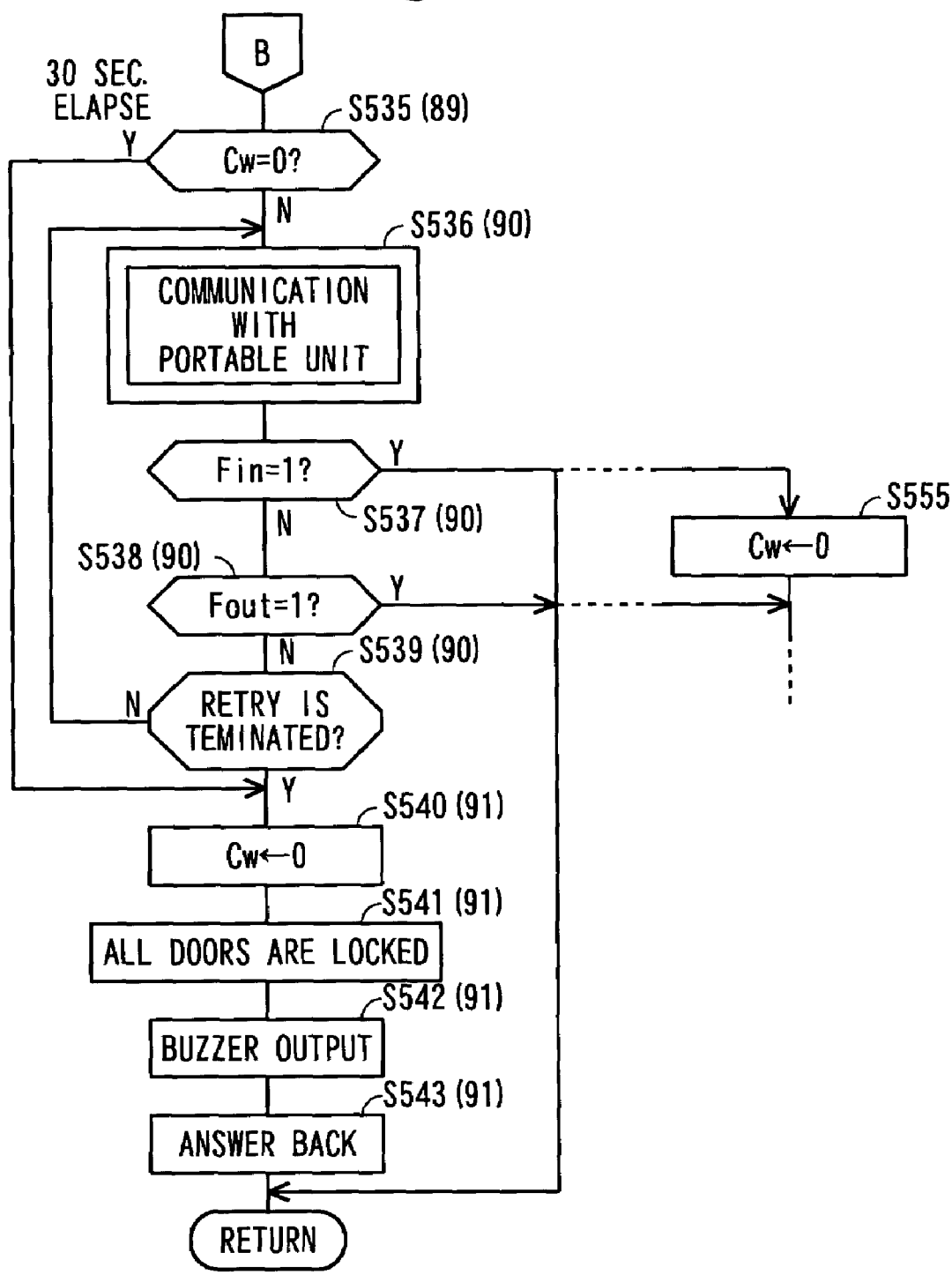

If such portable unit position determining procedure is applied instead of, for example, steps S537, S538 of FIG. 21, the position of the portable unit can be detected more accurately.

FIG. 26 summarizes the relationship between a detection result of a portable unit position according to the second embodiment of the present invention and whether or not auto lock is valid. Each step number in the Table corresponds to each step number in the flow chart of FIG. 18.

Because according to this embodiment, at the time when all the doors are closed (step S81→S74) and at the intermittent transmission time (S91), existence of the portable unit is recognized by transmitting the request signal to predetermined zones within the vehicle compartment and around the vehicle alternately (steps S76, S91), which zone the portable unit is located can be determined accurately and a precision control is attained according to its result.

For example, if the existence of the portable unit is detected (positive in step S537) even during intermittent transmission period of the request signal after the counter Cw begins down-count as indicated by a modification in FIG. 21, it is determined that user of the portable unit who has gotten out of the vehicle handed over that portable unit to a passenger and the counter Cw is reset in step S555 so as to stop the intermittent transmission without executing automatic locking. As a result, unnecessary communication can be prevented.

Further, according to the second embodiment, at the time of door opening when any door is just opened under the condition that all the doors are closed (step S70-S71), the position of the portable unit is recognized by executing alternate transmission (S71) of the request signal. Thus, a determination result about whether or not the door opening operation is attained by user of the portable unit can be considered, thereby enabling more accurate locking control.

If whether or not transmission of the request signal (transmission of the request signal when all the doors are closed) is executed based on whether or not the door opening operation is attained by user of the portable unit, when the doors are opened or closed to ride on or get out of the vehicle without carrying the portable unit for vehicle compartment cleaning or the like, no request signal is transmitted even if it is detected that all the doors are closed. Therefore, not only waste consumption of the vehicle battery is blocked, but also an unexpected automatic locking is prevented, so that convenience is never lost even if the automatic locking function is added.

According to the invention of claim 1, a request signal is sent at least within the vehicle compartment when opened door is just closed so that all the doors are closed. By detecting the position of the portable unit based on identification information sent back from the portable unit, riding on the vehicle and getting out of the vehicle are discriminated. If it is detected that the portable unit exists within the vehicle compartment thereby clarifying that user is riding on the vehicle, the transmission of the request signal is stopped. Thus, waste consumption of vehicle battery and portable unit battery is prevented and output of a locking signal is prohibited, thereby preventing automatic locking from occurring when only a passenger gets out of the vehicle.

According to the invention of claim 2, if it is detected that user gets out of the vehicle, the request signal is sent within the vehicle compartment and around the vehicle alternately and repeatedly multiple times. Consequently, even if the effective transmission zone is changed by disturbance noise, the position of the portable unit can be detected accurately. Additionally, because the request signal is sent within the vehicle compartment and around the vehicle alternately, the position of the portable unit 2 can be detected in a short time. Because if the portable unit is detected within the vehicle compartment, the transmission of the request signal which becomes unnecessary after that is stopped, even if a necessity of sending the request signal repeatedly considering an influence of disturbance noise occurs, wasteful consumption of vehicle battery and portable unit battery is prevented.

According to the invention of claim 3, even if the portable unit does not exist within the vehicle compartment when all doors are closed and it is determined that user of the portable unit is located outside the vehicle compartment based on this fact, the request signal is sent intermittently to predetermined regions within the vehicle compartment and around the vehicle and then, if at least it is detected that the portable unit does not exist outside the vehicle compartment, a locking signal is outputted. Consequently, an unexpected automatic locking during a work around the vehicle for adjustment of door mirror position or the like is prevented and if user of the portable unit leaves the vehicle, the automatic locking is executed to prevent forgetting of locking a vehicle key. Additionally, because the request signal is sent intermittently, wasteful consumption of the vehicle battery and portable unit battery is suppressed as small as possible during monitoring of the portable unit position.

According to the invention of claim 4, the second vehicle side transmitter sends the request signal repeatedly multiple times to the predetermined regions within the vehicle compartment and around the vehicle at an intermittent transmission timing (cycle) and when an existence of the portable unit is detected within the vehicle compartment, the repeated transmission of the request signal is stopped to go to a next intermittent transmission timing. That is, when the portable unit exists within the vehicle compartment, although it is detected that the portable unit does not exist within the vehicle compartment when user's getting out of the vehicle is detected, it is determined that the portable unit exists within an effective transmission zone expanded under the internal antenna due to an influence of disturbance noise, in other words, around the vehicle body and then, a next intermittent transmission timing begins. Consequently, wasteful transmission is blocked, thereby preventing wasteful consumption of vehicle battery and portable unit battery.

Further, because controller locks the door if second position detector cannot detect an existence of the portable unit outside the vehicle body within a cycle of the intermittent transmission, even if the effective transmission zone of the external antenna is reduced due to an influence of a single disturbance noise although the portable unit exists around the vehicle body, locking of the door by mistake is prevented.

According to the invention of claim 5, if the second position detector detects an existence of the portable unit within the vehicle compartment, the second vehicle side transmitter stops transmission of the request signal and the controller prohibits output of the locking signal. Thus, if the existence of the portable unit is detected within the vehicle compartment in the intermittent transmission period so that locking the vehicle key is not necessary, for example, in a case where user of the portable unit hands over that portable unit to a passenger after he gets out of the vehicle, unnecessary transmission is stopped immediately thereby preventing wasteful consumption of vehicle battery and portable unit battery and further blocking an unexpected locking of the vehicle key.

According to the invention of claim 6, if it is detected that at least one door is opened under a condition that all the doors are closed, the request signal is sent to predetermined regions within the vehicle compartment and around the vehicle. If getting out of the vehicle is detected in a case where the existence of the portable unit is detected within the vehicle compartment and around the vehicle, the request signal is sent to at least the predetermined region around the vehicle. Consequently, in addition to determination on whether or not user gets out of the vehicle, whether or not he or she carries the portable unit is determined thereby achieving accurate locking control. For example, if the door is opened or closed to ride on or get out of the vehicle without carrying the portable unit for cleaning the vehicle compartment or the like, even if it is detected that all the doors are closed, no request signal is sent. Thus, wasteful consumption of the vehicle battery is prevented and automatic locking is not carried out, thereby preventing an unexpected locking and protecting its convenience even if automatic locking function is added.

According to the invention of claim 7, if the request signal is sent to the vehicle compartment and then a response signal/identification signal is received from the portable unit, it is recognized that user of the portable unit rides on the vehicle and enters the vehicle compartment and sequent transmission of the request signal (intermittent transmission of the request signal to the predetermined region around the vehicle effective transmission zone A or B) is prohibited, that is, the auto lock processing is terminated. Thus, unnecessary communication with the portable unit is not established, so that the frequency of communication of the portable unit is reduced thereby prolonging the service life of the battery (power saving). Additionally, communication between the vehicle and the portable unit induced when only a passenger gets out can be blocked.

According to the invention of claim 8, if the request signal is sent to the vehicle compartment and then a response signal/identification signal is received from the portable unit when all the doors are just closed under a condition that any door is open, it is recognized that user of the portable unit rides on the vehicle and enters the vehicle compartment by this door closing motion and sequent transmission of the request signal (intermittent transmission of the request signal to the predetermined region around the vehicle effective transmission zone A or B) is prohibited, that is, the auto lock processing is terminated. Thus, unnecessary communication with the portable unit is not established, so that the frequency of communication of the portable unit is reduced thereby prolonging the service life of the battery (power saving). Additionally, communication between the vehicle and the portable unit induced when only a passenger gets out can be blocked.

According to the invention of claim 9, if it is recognized that the portable unit does not exist within the vehicle compartment (it is recognized that user of the portable unit gets out of the vehicle) when all the doors are just closed under a condition that any door is open, the auto lock processing is continued so that the request signal is sent intermittently to the predetermined region around the vehicle. If any response signal is not received and no portable unit exists in the predetermined region, automatic locking is executed. Thus, only when the automatic locking is necessary, that is, user of the portable unit gets out of the vehicle, the automatic locking is executed securely thereby preventing forgetting of locking the vehicle key. Additionally, the automatic locking during a work around the vehicle body, for example, adjustment of mirror position, can be blocked.

According to the invention of claim 10, in addition to the operation and effect of the feature (2), if the portable unit does not exist in the predetermined region around the vehicle, the request signal is sent to the vehicle compartment to verify again that the portable unit does not exist within the vehicle compartment and then, the automatic locking is carried out. Thus, the automatic locking due to leaving the portable unit within the vehicle compartment can be blocked securely.

According to the invention of claim 11, only when the request signal is sent to the predetermined regions within the vehicle compartment and around the vehicle in response to opening of any door under a condition that all the doors are closed and its corresponding response signal is received so as to verify that the portable unit securely exists within the vehicle compartment or in the predetermined region, the request signal described in the features (1) to (4) is sent corresponding to that the door is closed after that. Thus, the automatic locking is achieved securely regardless of the order about door closing operation by a passenger and door closing operation by a vehicle driver (user of the portable unit) and further when user of the portable unit gets out of the vehicle quickly, thereby preventing forgetting of locking the key. Additionally, it is possible to prevent locking of the key by mistake when other person carrying no portable unit opens or closes the door in a condition that it is unlocked.

According to the invention of claim 12, the request signal is not sent each time when each door is opened, but when any door is just opened under a condition that all the doors are closed, the request signal is sent to the predetermined region within the vehicle compartment or around the vehicle to verify that the portable unit securely exists in the predetermined region within the vehicle compartment or around the vehicle. After the verification, the request signal is not sent each time when any open door is closed, but the request signal is sent when all the doors are closed under a condition that any door is open. Consequently, the frequency of communication between the vehicle and the portable unit is reduced, thereby suppressing the frequency of sending back of the response signal to a minimum number, leading to prolonging of the service life of portable unit battery.

Further, it can be verified that the portable unit exists within the vehicle compartment or around the vehicle by minimum transmission frequency regardless of the order about the door closing operation by a passenger and the door closing operation by the vehicle driver (user of the portable unit).

According to the invention of claims 13, 14, if switch operation within the vehicle compartment or locking condition is detected, transmission of the request signal is prohibited and the auto lock processing is terminated. Consequently, unnecessary automatic locking in a case where a passenger stays in the vehicle compartment or a vehicle driver (user of the portable unit) locks the key intentionally by operating the key outside the vehicle is prevented and additionally, opportunity of sending a response signal from the portable unit is reduced, thereby prolonging the service life of the battery.

According to the invention of claim 15, the intermittent transmission of the request signal is carried out only in a predetermined period thereby prolonging the service life of the battery in the portable unit.

What is claimed is:

1. A wireless locking/unlocking device for a vehicle comprising:
   a vehicle side transmitter for sending a request signal to at least a predetermined zone in a vehicle compartment;
   a wireless portable unit for sending a response signal in response to the request signal;
   a vehicle side receiver for receiving the response signal;
   a position detector for detecting the position of the portable unit depending on whether or not the response signal received by the vehicle side receiver coincides with ID information stored in the vehicle;
   a controller for outputting a locking signal based on a detection result of the position detector; and
   an actuator for bringing a door lock mechanism into a locking state in response to the locking signal;
   an all-door closing detector which detects that all the doors of the vehicle are closed after a condition that at least one door is open and generates an all-door closing detecting signal, wherein the vehicle side transmitter sends the request signal in response to the all-door closing detecting signal and if it is detected that the portable unit exists within the vehicle compartment by the position detector, stops sending of sequent request signals, and if it is detected that the portable unit exists within the vehicle compartment by the position detector, the controller prohibits an output of the locking signal;
   a second vehicle side transmitter for, after the position of the portable unit is detected by the position detector based on the request signal, sending the request signal to the predetermined zones within the vehicle compartment and around the vehicle; and
   a second position detector for detecting the position of the portable unit depending on whether or not the response signal in response to the request signal sent by the second vehicle side transmitter coincides with ID information inherent of the vehicle,
   wherein the second vehicle side transmitter, if it is detected that the portable unit does not exist within the vehicle compartment by the position detector, sends the request signal to the predetermined zones within the vehicle compartment and around the vehicle intermittently, and
   wherein the controller, if it is detected that the portable unit does not exist at least outside the vehicle by the second position detector when it is detected that the portable unit does not exist within the vehicle compartment by the position detector, outputs the locking signal.

2. The wireless locking/unlocking device according to claim 1, wherein the vehicle side transmitter sends the request signal to a predetermined zone within the vehicle compartment and a predetermined zone around the vehicle alternately and repeatedly multiple times and when it is detected that the portable unit exists within the vehicle compartment, stops repeating of the sending of the request signal.

3. The wireless locking/unlocking device according to claim 1, wherein the second vehicle side transmitter sends the request signal to the predetermined zones within the vehicle compartment and around the vehicle alternately and repeatedly multiple times in an intermittent transmission cycle and when the second position detector detects an existence of the portable unit within the vehicle compartment, stops sending of the request signal and is shifted to a next intermittent transmission cycle and if the second position detector is incapable of detecting an existence of the portable unit in an intermittent transmission cycle, the intermittent transmission of the request signal is stopped, and wherein
   the controller, if the second position detector is incapable of detecting the existence of the portable unit in an intermittent transmission cycle, outputs the locking signal.

4. The wireless locking/unlocking device according to claim 1, wherein the second vehicle side transmitter, if the second position detector detects an existence of the portable unit within the vehicle compartment in an intermittent transmission cycle, stops sending of the request signal and
   the controller, if the second position detector detects an existence of the portable unit within the vehicle compartment in an intermittent transmission cycle, prohibits output of the locking signal.

5. A wireless locking/unlocking device for a vehicle comprising:
   a vehicle side transmitter for sending a request signal to at least a predetermined zone in a vehicle compartment;
   a wireless portable unit for sending a response signal in response to the request signal;
   a vehicle side receiver for receiving the response signal;
   a position detector for detecting the position of the portable unit depending on whether or not the response signal received by the vehicle side receiver coincides with ID information stored in the vehicle;

a controller for outputting a locking signal based on a detection result of the position detector; and an actuator for bringing a door lock mechanism into a locking state in response to the locking signal;

an all-door closing detector which detects that all the doors of the vehicle are closed after a condition that at least one door is open and generates an all-door closing detecting signal, wherein the vehicle side transmitter sends the request signal in response to the all-door closing detecting signal and if it is detected that the portable unit exists within the vehicle compartment by the position detector, stops sending of sequent request signals, and if it is detected that the portable unit exists within the vehicle compartment by the position detector, the controller prohibits an output of the locking signal;

a door opening detector for detecting a change of state that at least one vehicle door has changed from its closed state to its open state;

a third vehicle side transmitter for sending the request signal to the predetermined zone within the vehicle compartment and around the vehicle in response to the door open state detected by the door opening detector; and a third position detector which detects the position of the portable unit in response to the door open state detected by the door opening detector depending on whether or not the response signal coincides with ID information stored in the vehicle, wherein the vehicle side transmitter, if the third position detector detects an existence of the portable unit within the vehicle compartment and around the vehicle, sends the request signal to at least the predetermined zone within the vehicle compartment.

6. A wireless locking/unlocking device comprising:

a transmitter for sending a request signal;

a receiver for receiving a response signal including an ID code sent from a portable unit carried by a user in response to the request signal; and a controller for controlling the locking/unlocking of an opening/closing body corresponding to whether or not the ID code is received by the receiver; and a closing timing detector for detecting that the opening/closing body has just closed, wherein the transmitter sends a request signal to the vehicle compartment in response to closing of the opening/closing body detected by the closing timing detector, wherein when a response signal responding to a request signal sent within the vehicle compartment is received, sequent sending of the request signal to a predetermined zone around the vehicle is prohibited;

wherein when the response signal responding to the request signal sent within the vehicle compartment is not received, the transmitter sends the request signal to the predetermined zone around the vehicle intermittently, and wherein if the response signal responding to the request signal sent to the predetermined zone is not received, the transmitter sends the request signal again to the vehicle compartment, and the opening/closing body is locked under a condition that the response signal responding to the request signal sent again within the vehicle compartment is not received.

7. The wireless locking/unlocking device according to claim 6, wherein when a response signal responding to the request signal sent within the vehicle compartment is not received, the transmitter sends a request signal to a predetermined zone around the vehicle intermittently and the opening/closing body is locked under a condition that the response signal responding to the request signal sent to the predetermined zone is not received.

8. The wireless locking/unlocking device according to any one of claims 6 to 7, wherein the transmitter prohibits sending of the request signal in response to an operation signal of a switch disposed within the vehicle compartment.

9. The wireless locking/unlocking device according to any one of claims 6 to 7, further comprising a locking/unlocking detector for detecting the locking state and unlocking state of the opening/closing body, wherein the transmitter prohibits sending of the request signal corresponding to a detection of a locking state.

10. The wireless locking/unlocking device according to any one of claims 6 to 7, further comprising a timer which starts time counting in response to the detected closing timing of the opening/closing body, wherein the transmitter prohibits sending of the request signal when the timer counts a predetermined time.

11. A wireless locking/unlocking device comprising:

a transmitter for sending a request signal;

a receiver for receiving a response signal including an ID code sent from a portable unit carried by a user in response to the request signal; and a controller for controlling the locking/unlocking of an opening/closing body corresponding to whether or not the ID code is received by the receiver; and a closing timing detector for detecting that the opening/closing body has just closed, and an opening timing detector for detecting that the opening/closing body has just opened, wherein the transmitter sends a request signal to the vehicle compartment in response to closing of the opening/closing body detected by the closing timing detector, wherein when a response signal responding to a request signal sent within the vehicle compartment is received, sequent sending of the request signal to a predetermined zone around the vehicle is prohibited, wherein the transmitter sends the request signal to predetermined zones within the vehicle compartment and around the vehicle in response to opening of the opening/closing body detected by the opening timing detector, and wherein under a condition that the response signal responding to the request signal sent to the predetermined zones within the vehicle compartment and around the vehicle is received, the transmitter sends the request signal to the vehicle compartment in response to closing of the opening/closing body.

12. The wireless locking/unlocking device according to claim 11, wherein the opening timing detector detects the moment that any door of a vehicle is opened when all the doors have previously been closed, and the closing timing detector detects the moment that the last open door is closed so that all the doors are closed.

* * * * *